US012571681B2

(12) United States Patent
Hayashi et al.

(10) Patent No.: US 12,571,681 B2
(45) Date of Patent: Mar. 10, 2026

(54) SPECTROSCOPIC DEVICE AND SHAPE MEASUREMENT DEVICE COMPRISING AN ANALYSIS OPTICAL SYSTEM AND A LENGTH MEASUREMENT OPTICAL SYSTEM

(71) Applicant: SEIKO EPSON CORPORATION, Tokyo (JP)

(72) Inventors: Nobuhito Hayashi, Chino (JP); Kohei Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 154 days.

(21) Appl. No.: 18/612,104

(22) Filed: Mar. 21, 2024

(65) Prior Publication Data

US 2024/0319087 A1     Sep. 26, 2024

(30) Foreign Application Priority Data

Mar. 22, 2023    (JP) ................................. 2023-045064

(51) Int. Cl.
*G01J 3/02*         (2006.01)
*G01J 3/12*         (2006.01)
(Continued)

(52) U.S. Cl.
CPC .............. *G01J 3/4535* (2013.01); *G01J 3/12* (2013.01); *G01J 3/28* (2013.01); *G01J 3/443* (2013.01);
(Continued)

(58) Field of Classification Search
CPC ........ G01J 3/02; G01J 3/12; G01J 3/28; G01J 2003/2859; G01J 3/42; G01J 2003/423;
(Continued)

(56) References Cited

U.S. PATENT DOCUMENTS 4,998,017 A * 3/1991 Ryan .......................... G01J 3/26
                                                        356/454
5,461,234 A * 10/1995 Miyazaki ................ G02F 1/355
                                                        356/121
(Continued)

FOREIGN PATENT DOCUMENTS

JP          2007-285898 A      11/2007
JP          2016-142527 A       8/2016
(Continued)

*Primary Examiner* — Allen C. Ho
(74) *Attorney, Agent, or Firm* — Harness, Dickey & Pierce, P.L.C.

(57)                    ABSTRACT

A spectroscopic device includes: an analysis optical system; a length measurement optical system; and a calculation device. The analysis optical system includes a moving mirror and a first light receiving element. The length measurement optical system includes a second light source configured to emit laser light, a gas cell with a gas that absorbs light of a predetermined wavelength sealed therein and configured to cause the laser light to be incident thereon, an emitted light amount detection unit configured to detect an amount of light emitted from the gas cell and output an emitted light amount detection signal, a light source control unit configured to control a wavelength of the laser light based on the emitted light amount detection signal, and a length measurement unit configured to use the laser light to obtain a displacement signal corresponding to a position of the moving mirror, and the calculation device includes a moving mirror position calculation unit, a light intensity calculation unit, and a Fourier transform unit configured to generate a spectral pattern.

10 Claims, 25 Drawing Sheets

(51) Int. Cl.

| | |
|---|---|
| *G01J 3/28* | (2006.01) |
| *G01J 3/42* | (2006.01) |
| *G01J 3/443* | (2006.01) |
| *G01J 3/453* | (2006.01) |
| *G01N 21/01* | (2006.01) |
| *G01N 21/17* | (2006.01) |
| *G01N 21/31* | (2006.01) |
| *G01N 21/33* | (2006.01) |
| *G01N 21/35* | (2014.01) |
| *G01N 21/3504* | (2014.01) |
| *G01N 21/3581* | (2014.01) |
| *G01N 21/3586* | (2014.01) |
| *G01N 21/359* | (2014.01) |
| *G01N 21/39* | (2006.01) |
| *G01N 21/63* | (2006.01) |

(52) U.S. Cl.
CPC ............. *G01N 21/01* (2013.01); *G01N 21/17* (2013.01); *G01N 21/31* (2013.01); *G01N 21/33* (2013.01); *G01N 21/35* (2013.01); *G01N 21/3504* (2013.01); *G01N 21/3581* (2013.01); *G01N 21/3586* (2013.01); *G01N 21/359* (2013.01); *G01N 21/39* (2013.01); *G01J 2003/2859* (2013.01); *G01J 2003/423* (2013.01); *G01N 2021/0106* (2013.01); *G01N 2021/0112* (2013.01); *G01N 2021/1706* (2013.01); *G01N 2021/3595* (2013.01); *G01N 2201/0636* (2013.01); *G01N 2201/12769* (2013.01)

(58) Field of Classification Search
CPC ............ G01J 3/443; G01J 3/45; G01J 3/4535; G01N 21/01; G01N 2021/0106; G01N 2021/0112; G01N 21/17; G01N 2021/1706; G01N 21/31; G01N 21/33; G01N 21/35; G01N 21/3504; G01N 21/3581; G01N 21/3586; G01N 21/359; G01N 2021/3595; G01N 21/39; G01N 21/62; G01N 21/63
USPC ... 250/336.1, 338.1, 339.01, 339.02, 339.06, 250/339.07, 339.08, 339.11, 339.13
See application file for complete search history.

(56) References Cited

U.S. PATENT DOCUMENTS

| | | | | |
|---|---|---|---|---|
| 6,617,175 | B1 * | 9/2003 | Arno | G01N 21/3504 438/15 |
| 7,129,519 | B2 * | 10/2006 | Arno | G01J 3/427 438/414 |
| 7,176,464 | B2 * | 2/2007 | Oka | G01N 21/3504 250/343 |
| 9,341,516 | B2 * | 5/2016 | Zhu | G01J 3/453 |
| 10,066,992 | B2 * | 9/2018 | Ando | G01J 3/0297 |
| 10,794,819 | B2 * | 10/2020 | Ashcom | G01J 3/457 |
| 11,009,454 | B2 * | 5/2021 | Wakuda | G01N 21/359 |
| 11,054,309 | B2 * | 7/2021 | Suzuki | G01J 3/06 |
| 11,073,424 | B2 * | 7/2021 | Suzuki | G01J 3/0286 |
| 11,733,027 | B2 * | 8/2023 | Yamada | G02B 7/008 356/450 |
| 11,921,040 | B2 * | 3/2024 | Mano | G01J 3/42 |
| 11,953,427 | B2 * | 4/2024 | Feitisch | G01J 3/28 |
| 12,111,255 | B2 * | 10/2024 | Shibuya | G01N 21/39 |
| 12,442,686 | B2 * | 10/2025 | Yamada | G01J 3/28 |
| 2020/0124479 | A1 | 4/2020 | Suzuki et al. | |
| 2022/0065614 | A1 | 3/2022 | Yamada et al. | |

FOREIGN PATENT DOCUMENTS

| | | |
|---|---|---|
| JP | 2022-038156 A | 3/2022 |
| WO | 2019-009404 A1 | 1/2019 |

* cited by examiner

*FIG. 7*

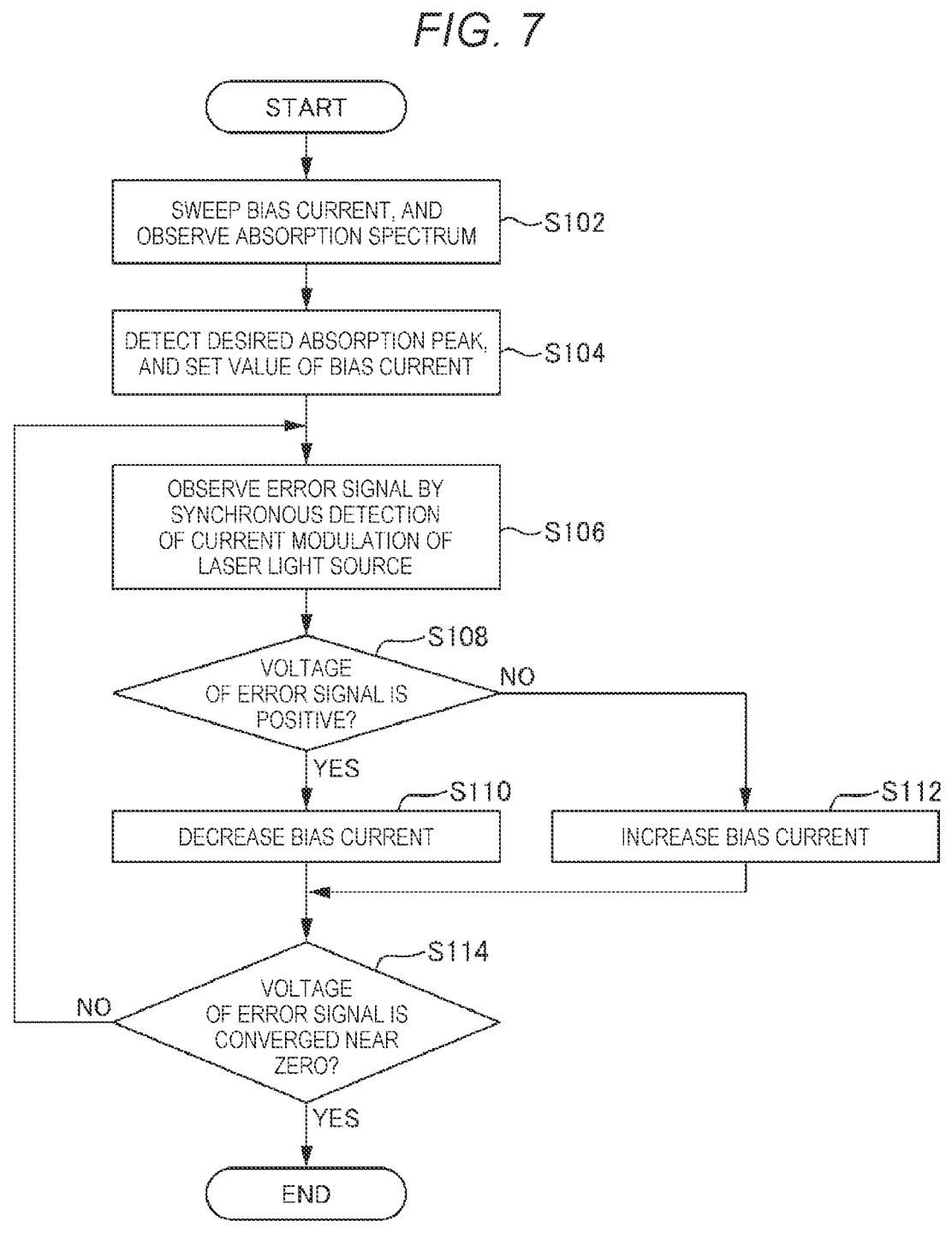

START

SWEEP BIAS CURRENT, AND
OBSERVE ABSORPTION SPECTRUM — S102

DETECT DESIRED ABSORPTION PEAK,
AND SET VALUE OF BIAS CURRENT — S104

OBSERVE ERROR SIGNAL BY
SYNCHRONOUS DETECTION
OF CURRENT MODULATION OF
LASER LIGHT SOURCE — S106

S108
VOLTAGE
OF ERROR SIGNAL IS
POSITIVE?

NO

YES

DECREASE BIAS CURRENT — S110

INCREASE BIAS CURRENT — S112

S114
VOLTAGE
OF ERROR SIGNAL IS
CONVERGED NEAR
ZERO?

NO

YES

END

TIME POINT t

OPTICAL PATH DIFFERENCE (μm)

TIME POINT t

SPECTROSCOPIC DEVICE AND SHAPE MEASUREMENT DEVICE COMPRISING AN ANALYSIS OPTICAL SYSTEM AND A LENGTH MEASUREMENT OPTICAL SYSTEM

The present application is based on, and claims priority from JP Application Serial Number 2023-045064, filed Mar. 22, 2023, the disclosure of which is hereby incorporated by reference herein in its entirety.

BACKGROUND

1. Technical Field

The present disclosure relates to a spectroscopic device and a shape measurement device.

2. Related Art

WO 2019/009404 discloses an optical module used for spectroscopy for obtaining spectrum information of light emitted or absorbed by a sample and analyzing components in the sample based on the spectrum information. The optical module includes a mirror unit, a beam splitter unit, a light incident unit, a first photodetector, a second light source, and a second photodetector. The mirror unit includes a movable mirror that moves in a predetermined direction and a fixed mirror whose position is fixed. In such an optical module, an interference optical system into which measurement light and laser light are incident is implemented by the beam splitter unit, the movable mirror, and the fixed mirror.

The measurement light incident from a first light source through a measurement target passes through the light incident unit and is split in the beam splitter unit. A part of the split measurement light is reflected by the movable mirror and is returned to the beam splitter unit. A remaining part of the split measurement light is reflected by the fixed mirror and is returned to the beam splitter unit. The part and the remaining part of the measurement light returned to the beam splitter unit are detected by the first photodetector as interference light.

Further, the laser light emitted from the second light source is split by the beam splitter unit. A part of the split laser light is reflected by the movable mirror and is returned to the beam splitter unit. A remaining part of the split laser light is reflected by the fixed mirror and is returned to the beam splitter unit. The part and the remaining part of the laser light returned to the beam splitter unit are detected by the second photodetector as interference light.

In such an optical module, a position of the movable mirror is measured based on a detection result of the interference light of the laser light. Further, based on a measurement result of the position of the movable mirror and the detection result of the interference light of the measurement light, the spectroscopy of the measurement target is possible. Specifically, a waveform called an interferogram is obtained by determining an intensity of the measurement light at each position of the movable mirror. By performing Fourier transform on the interferogram, spectrum information about the measurement target can be determined. Therefore, the optical module described in WO 2019/009404 is used for a Fourier transform infrared spectrometer (FTIR).

WO 2019/009404 is an example of the related art.

SUMMARY

In a Fourier transform spectrometer, measurement accuracy of the position of the movable mirror (moving mirror)

is directly linked to accuracy on a wavenumber axis (wavelength axis) of a spectral pattern. In the optical module disclosed in WO 2019/009404, the second light source that emits the laser light is required to have sufficiently high wavelength stability.

However, in a laser light source, a wavelength of the output laser light may change from an initial value due to various causes such as changes over time. In the optical module described in WO 2019/009404, when the wavelength of the laser light is changed from the initial value, the measurement accuracy of the position of the moving mirror decreases as compared with an initial state.

The optical module is also used in a shape measurement device that uses optical interference to measure a surface shape or an internal shape (internal structure) of an object. A moving mirror is also used in such a shape measurement device, and the measurement accuracy of the position of the moving mirror using the laser light influences a shape measurement result.

Therefore, an object is to implement a spectroscopic device capable of stabilizing a wavelength of laser light, measuring a position of a moving mirror with higher accuracy, and generating a spectral pattern with high accuracy on a wavenumber axis or a wavelength axis, and a shape measurement device with high shape measurement accuracy.

A spectroscopic device according to an application example of the present disclosure includes:

an analysis optical system;

a length measurement optical system; and a calculation device, the analysis optical system includes a moving mirror configured to add a first modulation signal by reflecting analysis light emitted from a first light source, and a first light receiving element configured to receive the analysis light including the first modulation signal and a sample-derived signal generated by an action between the analysis light emitted from the first light source and a sample, and output a first light receiving signal, the length measurement optical system includes a second light source configured to emit laser light, a gas cell with a gas that absorbs light of a predetermined wavelength sealed therein and configured to cause the laser light to be incident thereon, an emitted light amount detection unit configured to detect an amount of light emitted from the gas cell and output an emitted light amount detection signal, a light source control unit configured to control a wavelength of the laser light based on the emitted light amount detection signal, and a length measurement unit configured to use the laser light to obtain a displacement signal corresponding to a position of the moving mirror, and the calculation device includes a moving mirror position calculation unit configured to generate a moving mirror position signal based on the displacement signal, a light intensity calculation unit configured to generate, based on the first light receiving signal and the moving mirror position signal, a waveform representing an intensity of the first light receiving signal at the position of the moving mirror, and a Fourier transform unit configured to perform Fourier transform on the waveform to generate a spectral pattern including information derived from the sample.

A shape measurement device according to an application example of the present disclosure includes:

an analysis optical system;

a length measurement optical system; and a calculation device, the analysis optical system includes a moving mirror configured to add a first modulation signal by reflecting analysis light emitted from a first light source, and a first light receiving element configured to receive the analysis light including the first modulation signal and a sample-derived signal generated by an action between the analysis light emitted from the first light source and a sample, and output a first light receiving signal, the length measurement optical system includes a second light source configured to emit laser light, a gas cell with a gas that absorbs light of a predetermined wavelength sealed therein and configured to cause the laser light to be incident thereon, an emitted light amount detection unit configured to detect an amount of light emitted from the gas cell and output an emitted light amount detection signal, a light source control unit configured to control a wavelength of the laser light based on the emitted light amount detection signal, and a length measurement unit configured to use the laser light to obtain a displacement signal corresponding to a position of the moving mirror, and the calculation device includes a moving mirror position calculation unit configured to generate a moving mirror position signal based on the displacement signal, a light intensity calculation unit configured to generate, based on the first light receiving signal and the moving mirror position signal, a waveform representing an intensity of the first light receiving signal at the position of the moving mirror, and a shape calculation unit configured to calculate a shape of the sample based on the waveform.

BRIEF DESCRIPTION OF THE DRAWINGS

FIG. 7 is a flowchart showing feedback control on the bias current.

DESCRIPTION OF EMBODIMENTS

Hereinafter, a spectroscopic device and a shape measurement device according to the present disclosure will be described in detail based on embodiments shown in the accompanying drawings.

1. First Embodiment

First, a spectroscopic device according to a first embodiment will be described.

Figure 1:
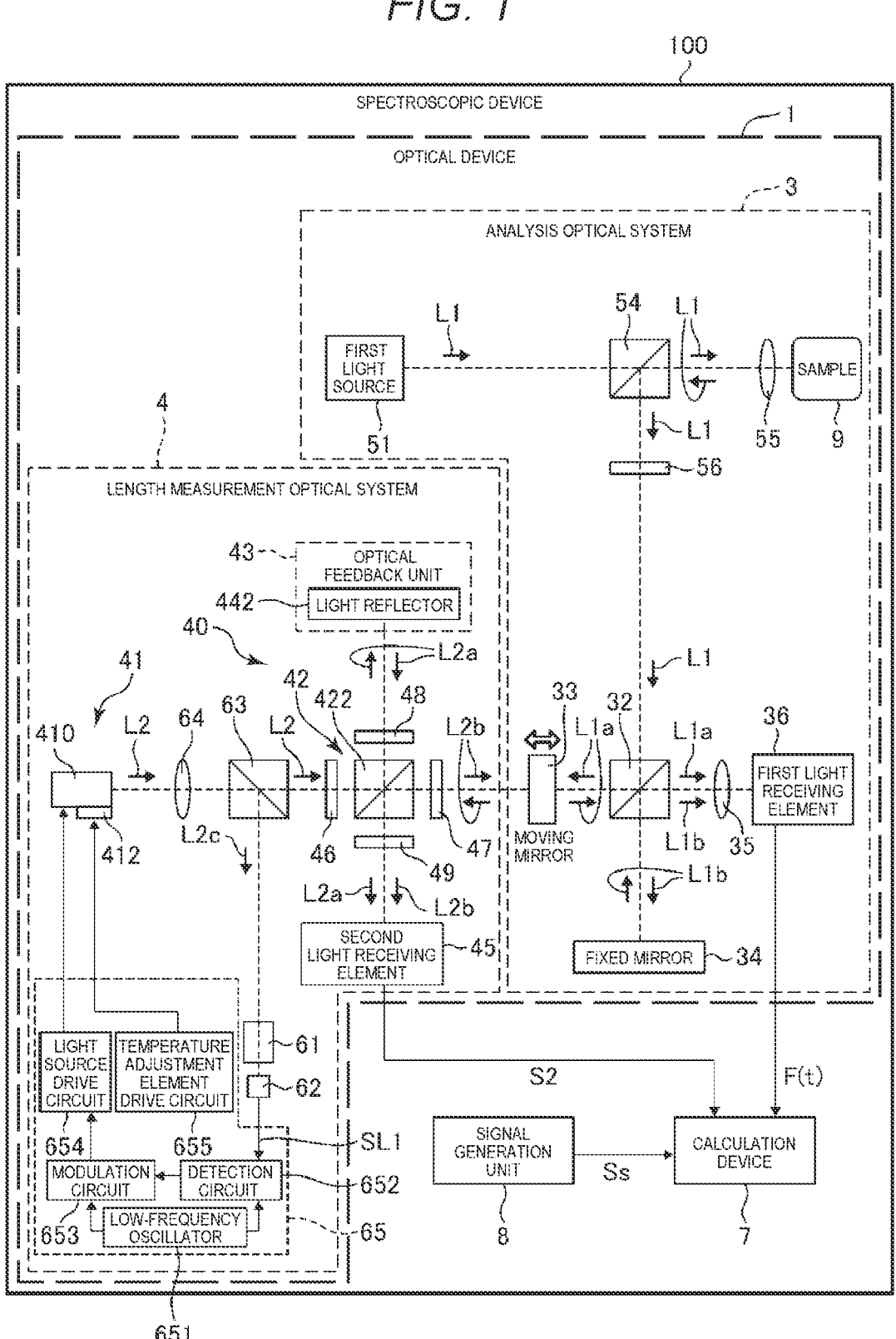
FIG. 1 is a schematic configuration diagram showing a spectroscopic device according to a first embodiment.
Figure 2:
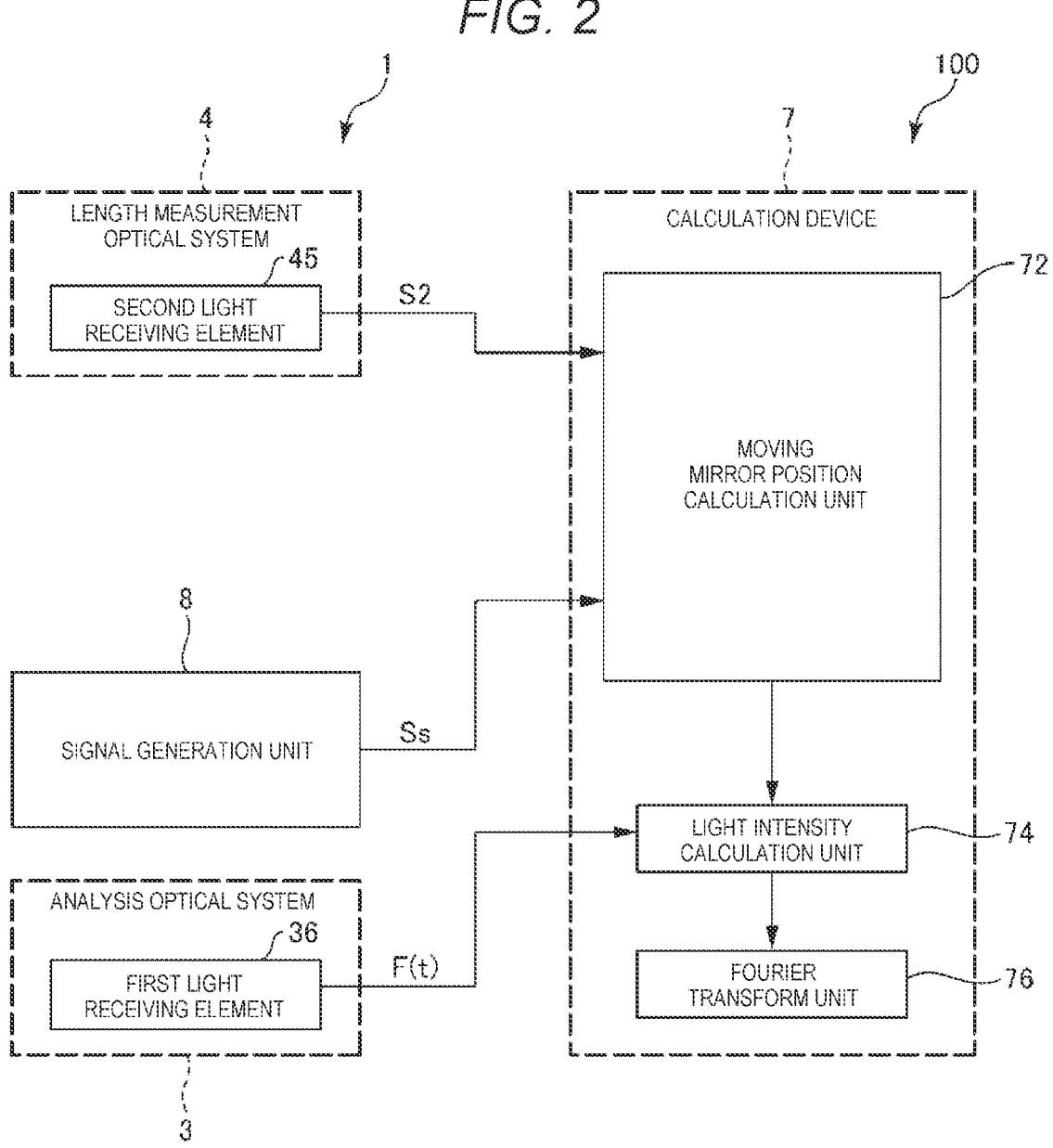
FIG. 2 is a schematic diagram showing main parts of an analysis optical system, a length measurement optical system, a signal generation unit, and a calculation device in FIG. 1.

FIG. 1 is a schematic configuration diagram showing a spectroscopic device 100 according to the first embodiment. FIG. 2 is a schematic diagram showing main parts of the analysis optical system 3, the length measurement optical system 4, the signal generation unit 8, and the calculation device 7 in FIG. 1.

1.1. Spectroscopic Device

In the spectroscopic device 100 shown in FIG. 1, an interferogram is obtained by irradiating a sample 9, which is an object to be detected, with incident analysis light L1, making the analysis light L1 emitted from the sample 9 to pass through a Michelson interference optical system, detecting a change in an intensity of obtained interference light, and performing calculation to be described later. By performing Fourier transform on the obtained interferogram, a spectral pattern including information derived from the sample 9 is obtained. By selecting a wavelength of the analysis light L1, the spectroscopic device 100 shown in FIG. 1 can be applied to, for example, Fourier infrared spectroscopy (FT-IR), Fourier type near-infrared spectroscopy (FT-NIR), Fourier visible spectroscopy (FT-VIS), Fourier ultraviolet spectroscopy (FT-UV) and Fourier terahertz spectroscopy (FT-THz) for the sample 9.

The spectroscopic device 100 includes an optical device 1, a signal generation unit 8, and a calculation device 7. As shown in FIG. 1, the optical device 1 includes an analysis optical system 3 and a length measurement optical system 4.

In order to extract a sample-derived signal derived from the sample 9 based on the analysis light L1 while irradiating the sample 9 with the analysis light L1, the analysis optical system 3 splits and mixes the analysis light L1 while changing an optical path length of the analysis light L1, thereby generating interference. In the length measurement optical system 4, a change in the optical path length of the analysis light L1 is measured using length measurement light L2 which is laser light.

The signal generation unit 8 outputs a reference signal Ss toward the calculation device 7. The calculation device 7 determines a waveform indicating an intensity of the interference light with respect to the optical path length, that is, the interferogram described above, based on a signal indicating the intensity of the interference light output from the analysis optical system 3 and a signal indicating the change in the optical path length output from the length measurement optical system 4. The calculation device 7 performs Fourier transform on the interferogram to obtain a spectral pattern.

1.2. Optical Device

Next, the optical device 1 will be described. As described above, the optical device 1 includes the analysis optical system 3 and the length measurement optical system 4.

1.2.1. Analysis Optical System

The analysis optical system 3 includes a first light source 51, a beam splitter 54, a condensing lens 55, and a neutral density filter 56. In the analysis optical system 3, a part of these optical elements described above may be omitted, optical elements other than these may be provided, or these optical elements may be replaced by other optical elements.

The first light source 51 is a light source that emits, for example, white light, that is, light obtained by gathering light of a wide wavelength as the analysis light L1. A wavelength range of the analysis light L1, that is, a type of the first light source 51 is appropriately selected according to the purpose of spectroscopy performed on the sample 9. When infrared spectroscopy is performed, examples of the first light source 51 include a halogen lamp, an infrared lamp, and a tungsten lamp. When visible light spectroscopy is performed, examples of the first light source 51 include a halogen lamp. When ultraviolet spectroscopy is performed, examples of the first light source 51 include a deuterium lamp, and an ultraviolet light emitting diode (UV-LED).

By selecting a wavelength of 100 nm or more and less than 760 nm as the wavelength of the analysis light L1, it is possible to implement the spectroscopic device 100 capable of performing the ultraviolet spectroscopy or the visible light spectroscopy. In addition, by selecting a wavelength of 760 nm or more and 20 μm or less as the wavelength of the analysis light L1, it is possible to implement the spectroscopic device 100 capable of performing the infrared spectroscopy or the near-infrared spectroscopy. Further, by selecting a wavelength of 30 μm or more and 3 mm or less as the wavelength of the analysis light L1, it is possible to implement the spectroscopic device 100 capable of performing terahertz wave spectroscopy.

The first light source 51 may not be provided in the optical device 1 and may be provided outside. In this case, the analysis light L1 emitted from the first light source 51 provided outside may be introduced into the optical device 1. Meanwhile, by providing the first light source 51 in the optical device 1 as in the embodiment, alignment accuracy between the first light source 51 and the beam splitter 54 can be particularly enhanced, and loss of the analysis light L1 caused by alignment failure can be reduced to the minimum.

The analysis light L1 passes through the beam splitter 54, is condensed by the condensing lens 55, and is emitted to the sample 9.

For example, a non-polarizing beam splitter is used as the beam splitter 54, but a polarizing beam splitter may also be used. In this case, a necessary wavelength plate may be appropriately added. A part of the analysis light L1 emitted from the first light source 51 is reflected by the beam splitter 54, whereas in the embodiment, the reflected analysis light L1 is left unused.

The condensing lens 55 condenses the analysis light L1 and reduces a spot size of the analysis light L1 with which the sample 9 is irradiated. Accordingly, local analysis is possible.

The analysis light L1 emitted from the sample 9 includes a sample-derived signal generated by an action between the analysis light L1 and the sample 9. Examples of the sample-derived signal include light absorption of a specific wavelength by the sample 9 when the analysis light L1 acts on the sample 9. The analysis light L1 passes through the condensing lens 55, is reflected by the beam splitter 54, and passes through the neutral density filter 56. The neutral density filter 56 selectively attenuates light of a predetermined wavelength. Accordingly, an S/N ratio (signal-to-noise ratio) of the sample-derived signal can be increased, and the spectroscopy can be performed with higher accuracy. Examples of the neutral density filter 56 include a notch filter having an optical density (OD value) of 6.0 or more.

The analysis optical system 3 includes a beam splitter 32, a moving mirror 33, a fixed mirror 34, a condensing lens 35, and a first light receiving element 36, which constitute a Michelson interference optical system. In the analysis optical system 3, a part of these optical elements described above may be omitted, optical elements other than these may be provided, or these optical elements may be replaced by other optical elements.

The beam splitter 32 is a non-polarizing beam splitter that splits the analysis light L1 into two parts including analysis light L1a and analysis light L1b. Specifically, the beam splitter 32 splits the analysis light L1 into two parts by reflecting a part of the analysis light L1 toward the moving mirror 33 as the analysis light L1a and transmitting the other part of the analysis light L1 toward the fixed mirror 34 as the analysis light L1b.

Examples of types of the beam splitter 32 include a plate-type element and a stacked-type element in addition to a prism-type element (cube-type element) shown in FIG. 1. Since wavelength dispersion occurs between the analysis light L1a and the analysis light L1b when the plate-type beam splitter 32 is used, a wavelength dispersion compensator may be disposed between the beam splitter 32 and the fixed mirror 34 if necessary. The wavelength dispersion compensator is an optical element that compensates for wavelength dispersion caused by an optical path length difference between glass materials. In the embodiment, since a prism-type element is used as the beam splitter 32, the wavelength dispersion compensator is unnecessary. The prism-type element is an element in which an optical thin film is sandwiched between prisms. In addition, the stacked-type element is an element in which an optical thin film is sandwiched between two transparent flat plates. Similarly to the prism-type element, the stacked-type element can also eliminate the need for the wavelength dispersion compensator. In addition, in the prism-type element and the stacked-type element, long-term reliability of the beam splitter 32 can be enhanced since the optical thin film is not exposed.

In addition, the beam splitter 32 transmits the analysis light L1a reflected by the moving mirror 33 toward the first light receiving element 36, and reflects the analysis light L1b reflected by the fixed mirror 34 toward the first light receiving element 36. Therefore, the beam splitter 32 mixes the split analysis light L1a and L1b.

The moving mirror 33 is a mirror that moves in an incident direction of the analysis light L1a toward the beam splitter 32 and reflects the analysis light L1a. A phase of the analysis light L1a reflected by the moving mirror 33 changes according to a position of the moving mirror 33. Accordingly, the moving mirror 33 adds a first modulation signal to the analysis light L1a. The first modulation signal is a change in phase added to the analysis light L1a according to the position of the moving mirror 33.

A moving mechanism (not shown) for moving the moving mirror 33 is not particularly limited, and includes, for example, a uniaxial linear stage, a piezo drive device, a microactuator using a micro electro mechanical systems (MEMS) technique. Among these, the uniaxial linear stage can implement good translational performance in moving the moving mirror 33 when being provided with, for example, a voice coil motor (VCM) or a ball screw drive unit and a linear guide mechanism.

The fixed mirror 34 is a mirror whose position is fixed relative to the beam splitter 32 and reflects the analysis light L1b. The analysis light L1b reflected by the fixed mirror 34 is mixed with the analysis light L1a by the beam splitter 32, and is received by the first light receiving element 36 as the interference light. In the analysis optical system 3, an optical path difference occurs between an optical path of the analysis light L1a and an optical path of the analysis light L1b according to the position of the moving mirror 33. Therefore, an intensity of the interference light changes according to the position of the moving mirror 33.

The moving mirror 33 and the fixed mirror 34 may each be a flat mirror or a corner cube mirror. A metal coat using a metal such as Al, Au, or Ag, a dielectric multilayer film, or the like may be formed at a reflective surface of each mirror. Regarding the moving mirror 33, "moving in the incident direction of the analysis light" includes moving in a direction in which a component of the analysis light in the incident direction is contained. Therefore, the moving mirror 33 may move in a direction obliquely inclined with respect to the incident direction (non-parallel direction). In this case, the calculation device 7 only needs to have a function of removing the influence of the moving mirror 33 obliquely inclined with respect to the incident direction of the analysis light. Further, the fixed mirror 34 may also move. In this case, the calculation device 7 only needs to have a function of removing the influence of the movement of the fixed mirror 34.

The condensing lens 35 condenses the interference light, that is, the mixed analysis light L1a and L1b, onto the first light receiving element 36.

The first light receiving element 36 receives the interference light and obtains an intensity thereof. A signal indicating a temporal change in intensity is output as a first light receiving signal F(t). The first light receiving signal F(t) includes the sample-derived signal generated by an interaction between the analysis light L1 and the sample 9, and the above-described first modulation signal.

Examples of the first light receiving element 36 include a photodiode and a phototransistor. Among these, examples of the photodiode include an InGaAs-based photodiode, a Si-based photodiode, and an avalanche type photodiode.

1.2.2. Length Measurement Optical System

The length measurement optical system 4 is a Michelson interference optical system, and includes a second light source 41, a length measurement unit 40, a gas cell 61, an emitted light amount detection unit 62, and a light source control unit 65. In the length measurement optical system 4, a part of these optical elements described above may be omitted, optical elements other than these may be provided, or these optical elements may be replaced by other optical elements.

The second light source 41 is preferably a light source that emits light having a narrow spectral line width. Examples of the second light source 41 include gas lasers such as a He—Ne laser and an Ar laser; semiconductor laser elements such as a distributed feedback-laser diode (DFB-LD), a fiber Bragg grating-laser diode (FBG-LD), a vertical cavity surface emitting laser (VCSEL) and a Fabry-Perot laser diode (FP-LD); and crystal lasers such as yttrium aluminum garnet (YAG).

The second light source 41 is particularly preferably a semiconductor laser element. Accordingly, it is possible to reduce a size and a weight of the optical device 1 and the spectroscopic device 100.

The second light source 41 shown in FIG. 1 includes a light emitting element 410 and a temperature adjustment element 412. In the embodiment, the light emitting element 410 is a semiconductor laser element.

The temperature adjustment element 412 is implemented by a Peltier element, a heater, or the like. Since the temperature adjustment element 412 generates or absorbs heat, a temperature of the light emitting element 410 of the second light source 41 can be adjusted. In the following description, the temperature of the light emitting element 410 may be referred to as a "temperature of the second light source 41".

The length measurement optical system 4 further includes a beam splitter 63 and a collimating lens 64.

The collimating lens 64 is provided between the second light source 41 and the beam splitter 63, and collimates the length measurement light L2 emitted from the second light source 41. When the length measurement light L2 is sufficiently collimated at the time of emission, the collimating lens 64 may be omitted.

The beam splitter 63 is, for example, a non-polarizing beam splitter. The beam splitter 63 causes the length measurement light L2 to branch so as to generate length measurement light L2c. In addition, the beam splitter 63 transmits a remaining part of the length measurement light L2 and causes the transmitted light to be incident on the length measurement unit 40. A branching ratio is not particularly limited, but is preferably set such that an amount of the transmitted light is larger than that of the reflected light, specifically, a ratio of the reflected light is about 10% or less.

1.2.2.1. Length Measurement Unit

The length measurement unit 40 includes a second light splitting element 42, an optical feedback unit 43, and a second light receiving element 45.

The second light splitting element 42 includes a beam splitter 422, a ½ wavelength plate 46, a ¼ wavelength plate 47, a ¼ wavelength plate 48, and an analyzer 49.

The beam splitter 422 is a polarizing beam splitter that transmits P-polarized light and reflects S-polarized light. The ½ wavelength plate 46 is disposed with an optical axis thereof rotated with respect to a polarization axis of the length measurement light L2. Accordingly, the length measurement light L2 passes through the ½ wavelength plate 46, becomes linearly polarized light including the P-polarized light and the S-polarized light, and is split into two parts including the P-polarized light and the S-polarized light by the beam splitter 422.

Length measurement light L2a, which is the S-polarized light, is converted into circularly polarized light by the ¼ wavelength plate 48 and is incident on the optical feedback unit 43. The optical feedback unit 43 returns the light to the beam splitter 422 by reflecting the length measurement light L2a. At this time, the length measurement light L2a is converted into the P-polarized light by the ¼ wavelength plate 48.

Meanwhile, length measurement light L2b, which is the P-polarized light, is converted into circularly polarized light by the ¼ wavelength plate 47, and is incident on the moving mirror 33. The moving mirror 33 reflects the length measurement light L2b. Accordingly, a phase of the length measurement light L2b changes according to the position of the moving mirror 33. As a result, the moving mirror 33 adds a displacement signal to the length measurement light L2b. The length measurement light L2b reflected by the moving mirror 33 is returned to the beam splitter 422. At this time, the length measurement light L2b is converted into the S-polarized light by the ¼ wavelength plate 47.

The length measurement optical system 4 shown in FIG. 1 has a configuration in which the length measurement light L2b is incident on a surface different from a surface of the moving mirror 33 on which the analysis light L1a in the above-described analysis optical system 3 is incident, but the length measurement light L2b may be incident on a surface the same as the surface on which the analysis light L1a is incident.

In addition, the beam splitter 422 transmits the length measurement light L2a fed back from the optical feedback unit 43 toward the second light receiving element 45, and reflects the length measurement light L2b reflected by the moving mirror 33 toward the second light receiving element 45. Therefore, the beam splitter 422 mixes the split length measurement light L2a and L2b. The mixed length measurement light L2a and L2b is transmitted through the analyzer 49 and is incident on the second light receiving element 45.

A non-polarizing beam splitter may be used as the beam splitter 422 instead of the polarizing beam splitter. In this case, since the wavelength plate or the like is unnecessary, the size of the optical device 1 can be reduced by reducing the number of components.

The optical feedback unit 43 includes a light reflector 442, reflects the light reflected and incident on the beam splitter 422, and returns the light to the beam splitter 422. The light reflector 442 is, for example, a mirror. Accordingly, the configuration of the optical feedback unit 43 can be simplified, and the size of the optical device 1 can be reduced.

The second light receiving element 45 receives the mixed length measurement light L2a and L2b as the interference light, and obtains an intensity thereof. A signal indicating a temporal change in intensity is output as a second light receiving signal S2. The second light receiving signal S2 is a signal including a displacement signal of the moving mirror 33. The displacement signal is a change in phase added to the length measurement light L2b according to the position of the moving mirror 33. As described above, the length measurement unit 40 obtains the displacement signal indicating the position of the moving mirror 33.

Examples of the second light receiving element 45 include a photodiode and a phototransistor.

1.2.2.2. Gas Cell

In the gas cell 61, a gas that absorbs light of a predetermined wavelength is sealed. When the length measurement light L2c is incident on the gas cell 61, a light absorption signal is added to the length measurement light L2c. The light absorption signal is light absorption of a specific wavelength determined by the gas.

Examples of the gas sealed in the gas cell 61 include gaseous alkali metals such as cesium and rubidium, halogens such as gaseous iodine, rare gases such as krypton, and also hydrogen cyanide and acetylene. These atoms or molecules absorb or emit light of a predetermined wavelength. The gas cell 61 may be provided with a temperature adjustment mechanism (not shown). Accordingly, a vapor pressure of the gas can be sufficiently enhanced even when a size of the gas cell 61 is further reduced. As a result, the size of the gas cell 61 can be reduced.

Table 1 below shows examples of combinations of gases (atoms or molecules) sealed in the gas cell 61 and wavelengths of light with which the gases are irradiated.

TABLE 1

| Wavelength | Atoms/molecules sealed in gas cell |
|---|---|
| 633 nm | Iodine |
| 780 nm | $^{85}$Rb (D2 line), $^{87}$Rb (D2 line) |
| 795 nm | $^{85}$Rb (D1 line), $^{87}$Rb (D1 line) |
| 852 nm | Cs (D2 line) |
| 895 nm | Cs (D1 line) |
| 1550 nm | HCN, $C_2H_2$, Kr |

The length measurement light L2c branched by the beam splitter 63 is incident on the gas cell 61. Then, the gas sealed in the gas cell 61 is irradiated with the length measurement light L2c. Accordingly, the atoms or molecules constituting the gas transition from a ground state to a state having higher energy (excited state) according to energy of the length measurement light L2c.

Figure 3:
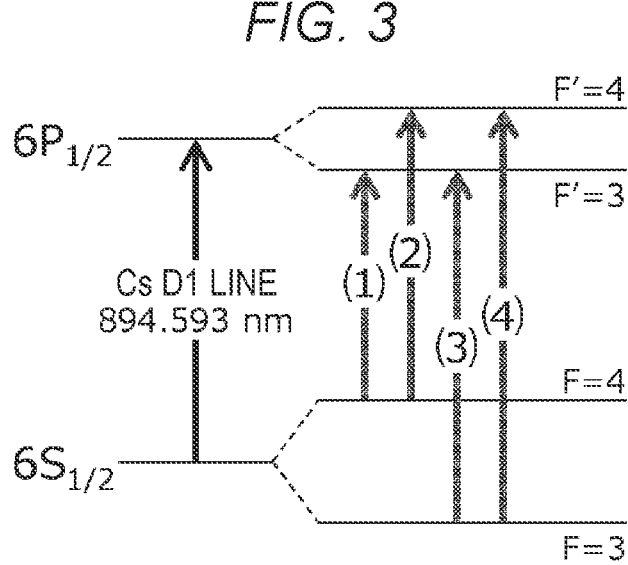
FIG. 3 is an energy level diagram showing an ultrafine structure in a ground state of cesium atoms.

FIG. 3 is an energy level diagram showing an ultrafine structure in a ground state of cesium atoms. As shown in FIG. 3, it is known that the cesium atoms have an energy level represented by $6S_{1/2}$ as a ground level and an energy level represented by $6P_{1/2}$ as an excitation level. Each energy level of $6S_{1/2}$ and $6P_{1/2}$ has an ultrafine structure split into a plurality of energy levels. Specifically, $6S_{1/2}$ has two ground levels represented by F=3 and F=4. Further, $6P_{1/2}$ has two excitation levels represented by F'=3 and F'=4.

The cesium atoms at the ground level transition to the excitation level by absorbing a Cs (D1) line shown in FIG. 3.

For example, the cesium atoms at the ground level of F=4 transition to the excitation level of F'=3 by absorbing energy between levels indicated by an arrow (1) in FIG. 3. Further, the cesium atoms transition to the excitation level of F'=4 by absorbing energy between levels indicated by an arrow (2) in FIG. 3.

Further, the cesium atoms at the ground level of F=3 transition to the excitation level of F'=3 by absorbing energy between levels indicated by an arrow (3) in FIG. 3. Further, the cesium atoms transition to the excitation level of F'=4 by absorbing energy between levels indicated by an arrow (4) in FIG. 3. Resonance wavelengths corresponding to the transitions of the arrows (1) to (4) in FIG. 3 are shown in Table 2 below.

TABLE 2

| Level | Transition | Resonance wavelength [nm] |
|---|---|---|
| (1) | $6S_{1/2}$ F = 4 → $6P_{1/2}$ F' = 3 | 894.6054 |
| (2) | $6S_{1/2}$ F = 4 → $6P_{1/2}$ F' = 4 | 894.6023 |
| (3) | $6S_{1/2}$ F = 3 → $6P_{1/2}$ F' = 3 | 894.5809 |
| (4) | $6S_{1/2}$ F = 3 → $6P_{1/2}$ F' = 4 | 894.5779 |

Figure 4:
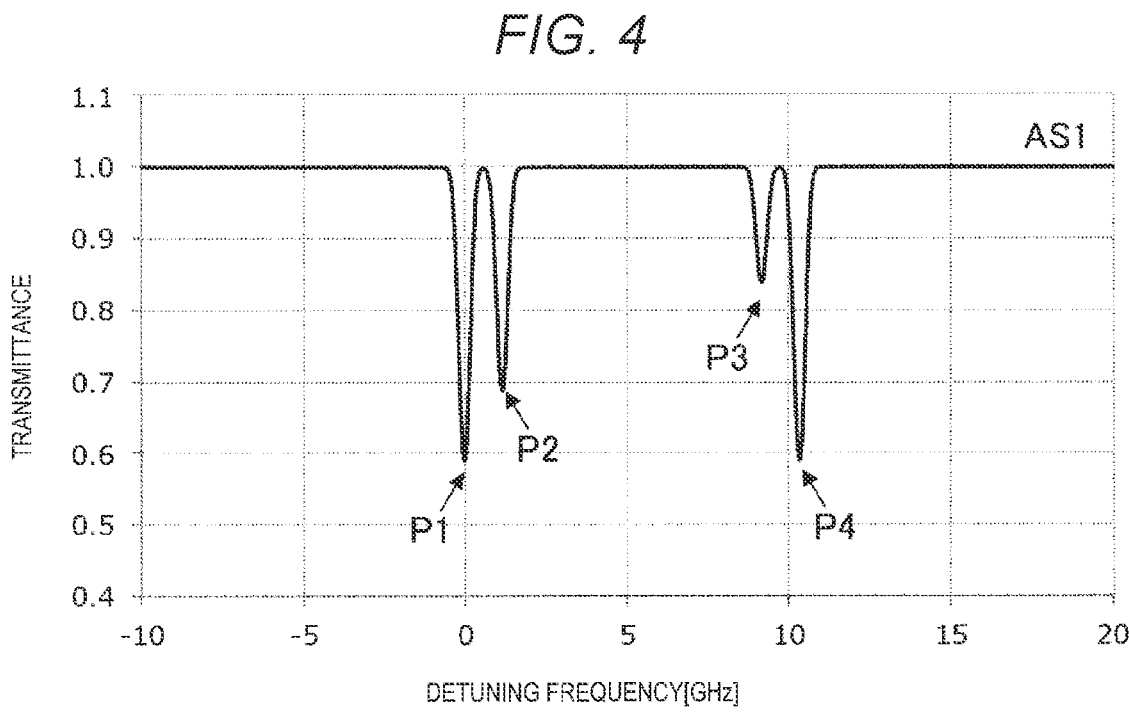
FIG. 4 is an absorption spectrum AS1 of Cs (D1 line) shown in FIG. 3.

FIG. 4 is an absorption spectrum AS1 of the Cs (D1) line shown in FIG. 3. Four absorption peaks P1 to P4 are observed in the absorption spectrum AS1 shown in FIG. 4. Frequencies of the absorption peaks P1 to P4 correspond to four transition frequencies represented by the arrows (1) to (4) in FIG. 3.

As described later, the light source control unit 65 adjusts a bias current to be input to the second light source 41. When the bias current is changed, an amount of the length measurement light L2 emitted from the second light source 41 is changed and a center wavelength (center frequency) is changed accordingly. Therefore, when the length measurement light L2c is incident on the gas cell 61 and a change in an amount of light emitted from the gas cell 61 is observed, an absorption spectrum AS2 as shown in FIG. 5 is obtained.

Figure 5:
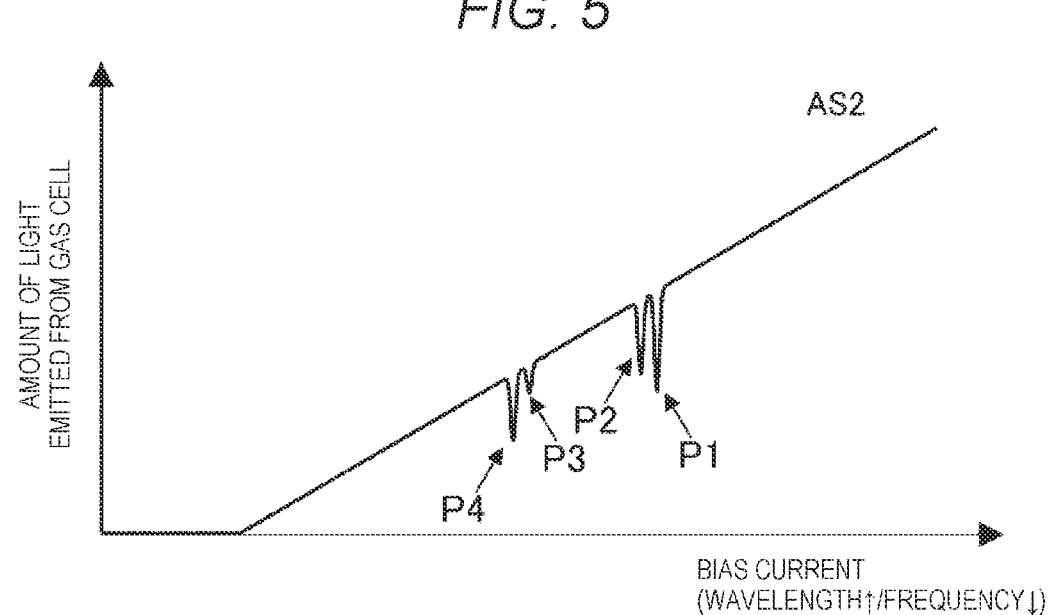
FIG. 5 is an absorption spectrum AS2 showing a relationship between a bias current to be input to a second light source and an amount of light emitted from a gas cell.

FIG. 5 is the absorption spectrum AS2 showing a relationship between the bias current to be input to the second light source 41 and the amount of light emitted from the gas cell 61. In FIG. 5, a horizontal axis indicates the bias current input to the second light source 41, and a vertical axis indicates the amount of light emitted from the gas cell 61. When the bias current increases, the center wavelength of the length measurement light L2 emitted from the second light source 41 increases and the center frequency decreases, which is thus represented in FIG. 5 by directions of arrows attached to the horizontal axis.

As shown in FIG. 5, when the bias current increases, the amount of light emitted from the gas cell 61 also increases.

Therefore, the absorption spectrum AS2 shown in FIG. 5 is basically a monotonically increasing spectrum. Meanwhile, in the second light source 41, the center wavelength of the length measurement light L2 also changes according to the bias current. Therefore, when the center wavelength (center frequency) of the length measurement light L2c coincides with the above-described four transition frequencies in a process of changing the bias current, the amount of light emitted from the gas cell 61 takes a minimum value. Here, the light source control unit 65 to be described later adjusts the bias current such that the amount of light emitted from the gas cell 61 has a minimum value corresponding to any one of the four absorption peaks P1 to P4. As a result, the center wavelength of the length measurement light L2 emitted from the second light source 41 can be stabilized. The frequencies of the absorption peaks P1 to P4 correspond to the energy between levels of atoms or molecules sealed in the gas cell 61, and are extremely high in accuracy and stability. Therefore, the center wavelength of the length measurement light L2 can be stabilized with high accuracy.

In FIG. 5, any absorption peak may be selected, but an absorption peak having a largest bias current is preferably selected. Accordingly, since light output of the second light source 41 is maximized, an amount of the interference light incident on the second light receiving element 45 can be maximized. As a result, an S/N ratio (signal-to-noise ratio) of the second light receiving signal S2 can be increased. In FIG. 5, the absorption peaks P1 to P4 are decomposed from each other, and may be observed as one peak without being decomposed from each other. In this case, since the peak appears at a wavelength of 894.593 nm of the Cs (D1) line shown in FIG. 3, the wavelength may be used.

Although the optical elements provided in each optical system are described above, it is preferable that an anti-reflection treatment is applied to an optical element that requires light to be incident thereon. Accordingly, S/N ratios of the first light receiving signal F(t) and the second light receiving signal S2 can be increased.

1.2.2.3. Emitted Light Amount Detection Unit

The emitted light amount detection unit 62 detects the amount of light emitted from the gas cell 61. Then, an emitted light amount detection signal SL1 corresponding to the amount of light is output. Examples of the emitted light amount detection unit 62 include a photodiode and a phototransistor.

1.2.2.4. Light Source Control Unit

The light source control unit 65 controls, based on the emitted light amount detection signal SL1, the wavelength of the length measurement light L2 emitted from the second light source 41.

The light source control unit 65 shown in FIG. 1 includes a low-frequency oscillator 651, a detection circuit 652, a modulation circuit 653, a light source drive circuit 654, and a temperature adjustment element drive circuit 655.

The low-frequency oscillator 651 oscillates at a low frequency of, for example, about several Hz to several hundred Hz and outputs a low-frequency signal.

The emitted light amount detection signal SL1 is input to the detection circuit 652. Since modulation is applied to the bias current by the modulation circuit 653 to be described later, the emitted light amount detection signal SL1 includes a result of sweeping the bias current in a range determined by an amplitude of the low-frequency signal. That is, the wavelength (frequency) of the length measurement light L2 vibrates in a predetermined range, and vibration of the change in the emitted light amount corresponding to the vibration is included. Therefore, in the detection circuit 652, a relationship between the bias current and the emitted light amount is obtained, and an absorption spectrum AS3 shown in FIG. 6 is obtained.

Figure 6:
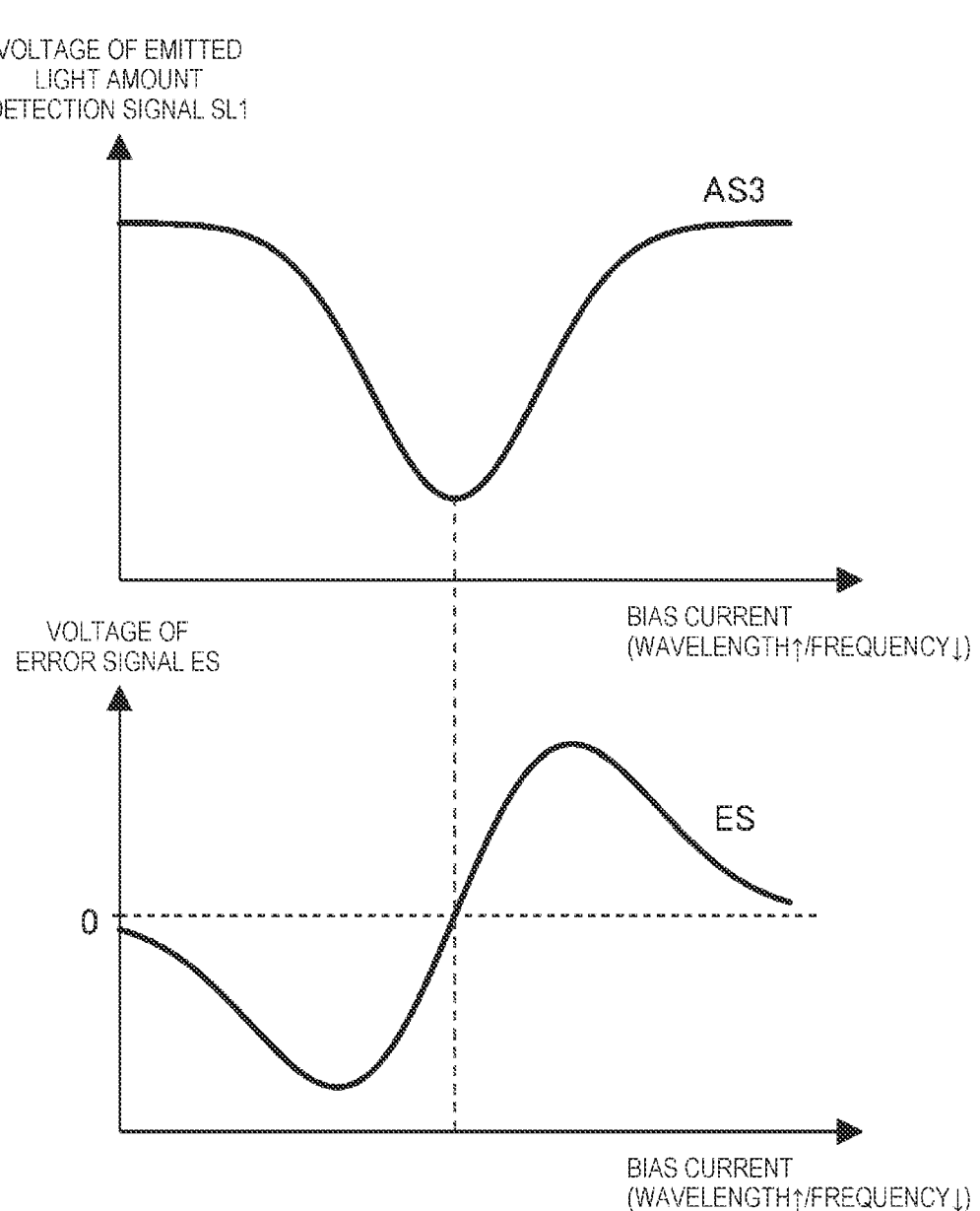
FIG. 6 is a diagram showing an absorption spectrum AS3 showing a relationship between the bias current to be input to the second light source and a voltage of an emitted light amount detection signal, and a waveform of an error signal ES which is a first derivative of the absorption spectrum AS3.

FIG. 6 is a diagram showing the absorption spectrum AS3 showing a relationship between the bias current to be input to the second light source 41 and a voltage of the emitted light amount detection signal SL1, and a waveform of an error signal ES which is a first derivative of the absorption spectrum AS3.

A horizontal axis of the absorption spectrum AS3 in FIG. 6 indicates the bias current input to the second light source 41, and a vertical axis indicates the emitted light amount detection signal SL1 which is a voltage signal. The error signal ES in FIG. 6 is generated by differentiating the absorption spectrum AS3. A horizontal axis of the waveform of the error signal ES indicates the bias current to be input to the second light source 41, and a vertical axis indicates a voltage of the error signal ES.

As shown in FIG. 6, the error signal ES has a zero-cross point corresponding to an absorption peak of the absorption spectrum AS3, and the error signal changes monotonically before and after the zero-cross point. Therefore, in the light source drive circuit 654 shown in FIG. 1, the bias current can be adjusted based on the error signal ES corresponding to the absorption peak such that the amount of light emitted from the gas cell 61 takes a minimum value. Accordingly, the center wavelength (center frequency) of the length measurement light L2 emitted from the second light source 41 is locked to any frequency of the absorption peaks P1 to P4 and is stabilized.

As described above, the detection circuit 652 synchronously detects the emitted light amount detection signal SL1 at the frequency of the low-frequency signal. Accordingly, the error signal ES shown in FIG. 6 is generated and output.

The modulation circuit 653 applies modulation to the error signal ES using the low-frequency signal. Then, the error signal ES to which the modulation is applied is output.

The light source drive circuit 654 adjusts the bias current to be input to the second light source 41 using the error signal ES applied with the modulation. For example, when the voltage of the error signal ES is positive, the bias current is decreased, and when the voltage of the error signal ES is negative, the bias current is increased. The light source drive circuit 654 sweeps the bias current with a predetermined width. According to the above operation, even when the amount of light emitted from the gas cell 61 is shifted from the minimum value, the shift is fed back to the bias current and adjusted to approach the minimum value. As a result, the center wavelength (center frequency) of the length measurement light L2 is locked to any peak top of the absorption peaks P1 to P4 and is stabilized.

The absorption peaks P1 to P4 have a Doppler spread associated with movement of atoms or molecules sealed in the gas cell 61. For example, when the gas includes cesium atoms, the Doppler spread is about 380 MHz at 60° C. In order to lock the center wavelength of the length measurement light L2 to the peak top, it is preferable to make a frequency width of the modulation smaller than the Doppler spread. That is, a modulation width of the bias current is preferably set such that the frequency width of the modulation is less than the Doppler spread. In addition, in consideration of more stable operation, the frequency width of the modulation is preferably set to $\frac{1}{2}$ or less of the Doppler spread, and more preferably set to $\frac{1}{3}$ or less of the Doppler spread. Meanwhile, a lower limit value is appropriately set so as to stabilize feedback control, and is set to, for example, $\frac{1}{20}$ or more of the Doppler spread.

FIG. 7 is a flowchart showing the feedback control on the bias current described above.

In step S102 shown in FIG. 7, the bias current is swept, and the absorption spectrum AS3 is observed.

In step S104, a desired absorption peak is detected, and a value of the bias current is set. In step S106, the error signal ES is observed by synchronous detection of current modulation of the second light source 41 which is a laser light source.

In step S108, it is determined whether the voltage of the error signal ES is positive. When the voltage is positive, the processing proceeds to step S110. In step S110, the bias current is adjusted to decrease. On the other hand, when the voltage is negative, the processing proceeds to step S112. In step S112, the bias current is adjusted to increase.

In step S114, it is determined whether the voltage of the error signal ES is converged near zero. When the voltage is not converged, the processing returns to step S106. When the voltage is converged, the flow ends.

Then, the above flow is repeated as necessary. Accordingly, the center wavelength (center frequency) of the length measurement light L2 can be stabilized. Such feedback control on the bias current is useful in having a relatively high response in stabilizing the center wavelength and contributing to high stabilization of the center wavelength of the length measurement light L2.

The feedback control described above may be executed all the time, or may be executed as necessary. For example, when measurement is performed on the moving mirror 33, the feedback control may be stopped. Accordingly, the feedback control can be prevented from influencing measurement accuracy.

The temperature adjustment element drive circuit 655 outputs a temperature adjustment signal to the temperature adjustment element 412. Accordingly, heat generation or heat absorption of the temperature adjustment element 412 is adjusted, and the temperature of the second light source 41 is controlled to a target temperature. The temperature adjustment element drive circuit 655 shown in FIG. 1 fixes the temperature of the second light source 41 preferably to a constant value. Accordingly, an operation of the light source drive circuit 654 can be prevented from being hindered. In the embodiment, the temperature adjustment element 412 and the temperature adjustment element drive circuit 655 may be omitted.

1.3. Signal Generation Unit

The signal generation unit 8 shown in FIG. 2 generates a periodic signal and outputs the periodic signal as the reference signal Ss. Examples of the signal generation unit 8 include a function generator, a signal generator, and a numerically controlled signal generator. The calculation device 7 to be described later generates, based on the reference signal Ss and the displacement signal described above, a moving mirror position signal X(t).

1.4. Calculation Device

The calculation device 7 shown in FIG. 2 includes the moving mirror position calculation unit 72, the light intensity calculation unit 74, and the Fourier transform unit 76. Functions exhibited by these functional units are implemented by hardware including, for example, a processor, a memory, an external interface, an input unit, and a display unit. Specifically, the functions are implemented by the processor reading and executing a program stored in the memory. These components can communicate with one another by an external bus.

Examples of the processor include the central processing unit (CPU) and a digital signal processor (DSP). Instead of a method in which the processor executes software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB) and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel. The input unit and the display unit may be provided as necessary, and may be omitted.

1.4.1. Moving Mirror Position Calculation Unit

The moving mirror position calculation unit 72 performs, based on the reference signal Ss output from the signal generation unit 8, calculation on the second light receiving signal S2 including the displacement signal of the moving mirror 33. Accordingly, the moving mirror position signal X(t) indicating the position of the moving mirror 33 is generated. When the moving mirror 33 moves, the intensity of the interference light in the length measurement optical system 4 changes accordingly. In this case, the second light receiving signal S2 is, for example, a signal whose amplitude periodically changes according to an interference condition. The displacement of the moving mirror 33 can be calculated based on the change in the amplitude of the second light receiving signal S2, and the moving mirror position signal X(t) is determined.

A measured displacement d of the moving mirror 33 represented by the moving mirror position signal X (t) is represented by the following Formula (A).

$$d = \frac{\lambda}{4\pi n}\phi \qquad \text{(A)}$$

In Formula (A), $\lambda$ is the wavelength of the length measurement light L2, n is a refractive index of an atmosphere, and $\varphi$ is a phase of the length measurement light L2$b$ reflected by the moving mirror 33.

As can be seen from the above Formula (A), the measured displacement d is influenced by the wavelength $\lambda$ of the length measurement light L2. For example, a case in which an initial wavelength $\lambda$ becomes $\lambda'$ due to changes over time or the like is considered. When the measured displacement in this case is set as d', the measured displacement d' is represented by the following Formula (A')

$$d' = \frac{\lambda'}{4\pi n}\phi \qquad \text{(A')}$$

Here, a change rate when the initial measured displacement d changes to the measured displacement d' is denoted by $\Delta d/d$. The change rate $\Delta d/d$ of the measured displacement is expressed by the following Formula (B).

$$\frac{\Delta d}{d} = \frac{d' - d}{d} = \frac{\lambda' - \lambda}{\lambda} = \frac{\Delta\lambda}{\lambda} \qquad \text{(B)}$$

Accordingly, it is understood that the change rate $\Delta\lambda/\lambda$ of the wavelength influences the change rate $\Delta d/d$ of the measured displacement. Accordingly, if the wavelength of the length measurement light L2 can be stabilized, accuracy of the measured displacement d can be enhanced.

1.4.2. Light Intensity Calculation Unit

The light intensity calculation unit 74 generates, based on the first light receiving signal F(t) and the moving mirror position signal X(t), a waveform (interferogram F(x)) representing the intensity of the interference light with respect to the position of the moving mirror 33.

As described above, the first light receiving signal F(t) includes the sample-derived signal and the first modulation signal. The light intensity calculation unit 74 extracts an intensity of the first light receiving signal F(t) based on the moving mirror position signal X(t). Further, the light intensity calculation unit 74 generates the interferogram F(x) based on the position of the moving mirror 33 and the intensity of the first light receiving signal F(t) which are determined based on the moving mirror position signal X(t). The interferogram F(x) is represented by a function of an optical path difference between reflected light from the moving mirror 33 and reflected light from the fixed mirror 34 in the analysis optical system 3 and the intensity of the interference light received by the first light receiving element 36 (intensity of the first light receiving signal F(t)).

Figure 8:
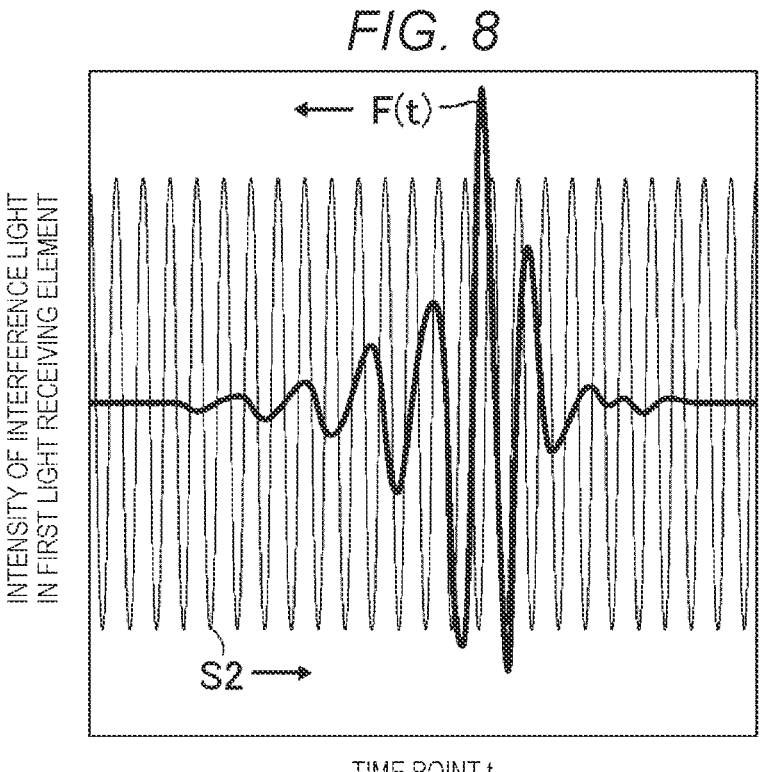
FIG. 8 is a diagram showing an example of a first light receiving signal F(t) and a second light receiving signal S2 obtained by the optical device shown in FIG. 1.

FIG. 8 is a diagram showing an example of the first light receiving signal F(t) and the second light receiving signal S2 obtained by the optical device 1 shown in FIG. 1. A horizontal axis in FIG. 8 indicates a time point, and a vertical axis indicates an intensity of the interference light incident on the first light receiving element 36 or an intensity of the interference light incident on the second light receiving element 45.

Figure 9:
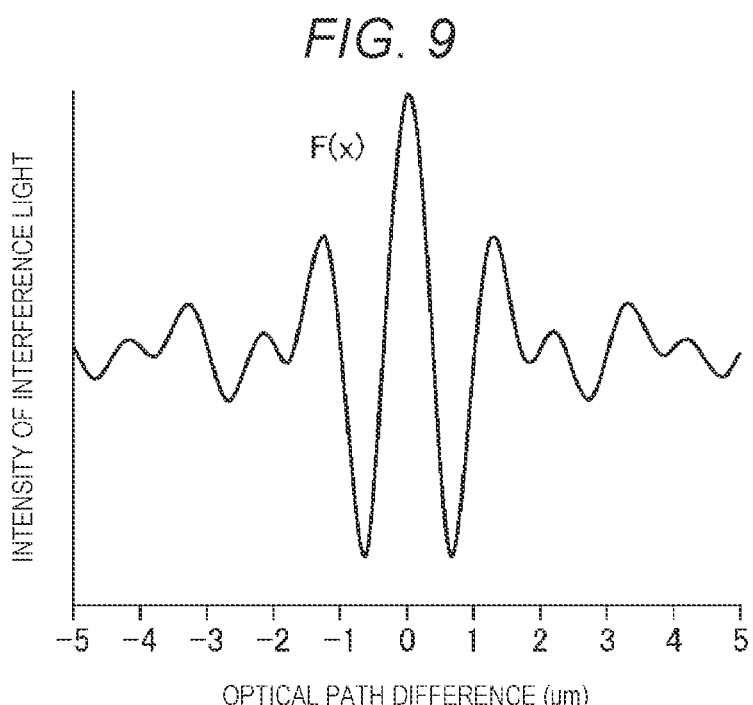
FIG. 9 is a diagram showing an example of an interferogram F(x).

FIG. 9 is a diagram showing an example of the interferogram F(x). A horizontal axis of FIG. 9 indicates the optical path difference in the analysis optical system 3, and a vertical axis indicates the intensity of the interference light. The optical path difference in the analysis optical system 3 is a difference between an optical path length between the beam splitter 32 and the moving mirror 33 and an optical path length between the beam splitter 32 and the fixed mirror 34. In FIG. 9, a zero optical path difference is taken as an origin of the horizontal axis.

Figure 10:
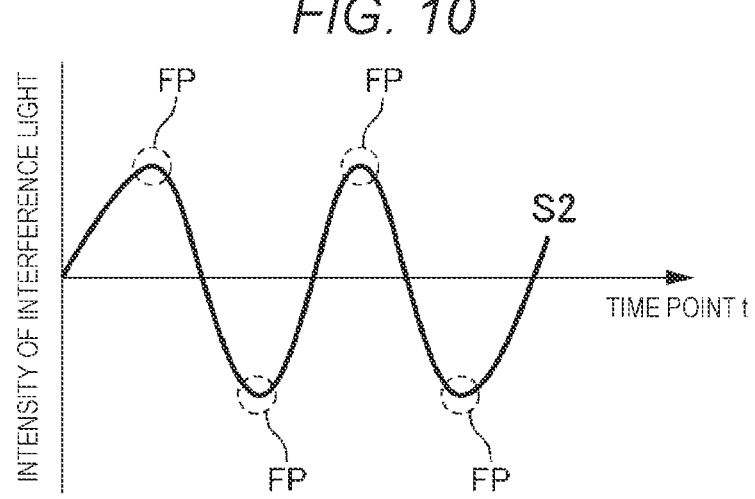
FIG. 10 is a partially enlarged view of the second light receiving signal S2 shown in FIG. 8.

FIG. 10 is a partially enlarged view of the second light receiving signal S2 shown in FIG. 8. The second light receiving signal S2 shown in FIG. 8 is a signal that vibrates at a predetermined cycle, and a point at which an amplitude is maximum is a feature point FP. The light intensity calculation unit 74 can associate the position of the moving mirror 33 with the intensity of the first light receiving signal F(t) by extracting the intensity of the first light receiving signal F(t) shown in FIG. 8 at the time points of the feature points FP. Accordingly, digital data of the interferogram F(x) can be obtained.

The wavelength stability of the length measurement light L2 is directly linked to the accuracy of the position of the moving mirror 33. Therefore, the accuracy of the optical path difference of the analysis optical system 3, which is the horizontal axis of the interferogram F(x), can be enhanced by stabilizing the wavelength of the length measurement light L2 using the gas cell 61.

1.4.3. Fourier Transform Unit

The Fourier transform unit 76 performs Fourier transform on the interferogram F(x). Accordingly, a spectral pattern including information unique to the sample 9 is obtained.

Figure 11:
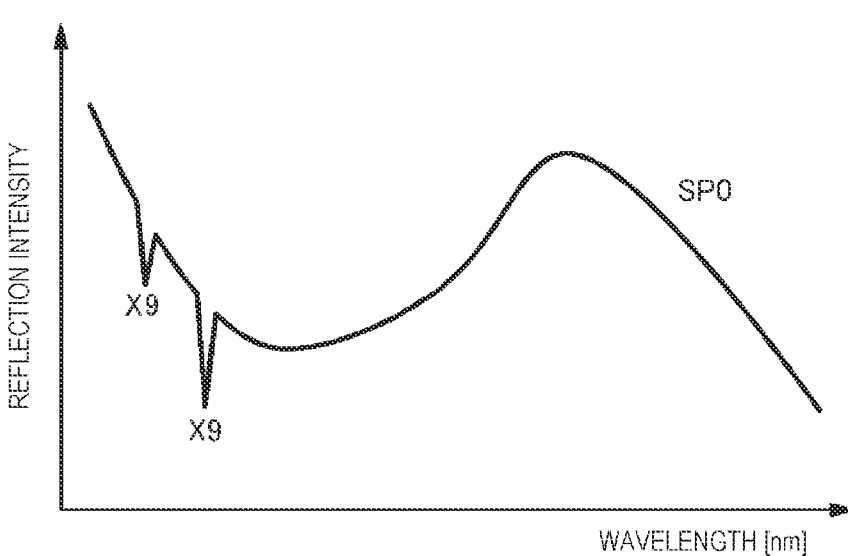
FIG. 11 is an example of a spectral pattern SP0 obtained by performing spectroscopy on a sample.

FIG. 11 is an example of a spectral pattern SP0 obtained by performing spectroscopy on the sample 9. The spectral pattern SP0 is an example of a reflection spectrum of the sample 9.

In the spectral pattern SP0 shown in FIG. 11, the sample-derived signal generated by the analysis light L1 acting on the sample 9 is reflected as an absorption peak X9. According to the spectroscopic device 100, characteristics of the sample 9, for example, a material, a structure, and a component, can be analyzed based on the spectral pattern SP0.

The spectral pattern SP0 is generated by performing Fourier transform on the interferogram F(x). Since the interferogram F(x) is an electric field amplitude waveform obtained by using position information of the moving mirror 33 as a parameter, the spectral pattern SP0 obtained by performing Fourier transform on the electric field amplitude waveform has wavelength information. Further, positional accuracy of the moving mirror 33 is directly linked to wavenumber accuracy of the spectral pattern SP0. Therefore, according to the spectroscopic device 100 of the embodiment, the spectral pattern SP0 with high accuracy on the wavelength axis (wavenumber axis) can be generated.

In addition, in order to obtain the above-described effect, even when a small and inexpensive element such as a semiconductor laser element is adopted as the second light source 41, the wavelength stability of the length measurement light L2 can be enhanced. Accordingly, it is possible to reduce a size, a weight, power consumption, and cost of the spectroscopic device 100.

2. First Modification of First Embodiment

Next, a spectroscopic device according to a first modification of the first embodiment will be described.

Figure 12:
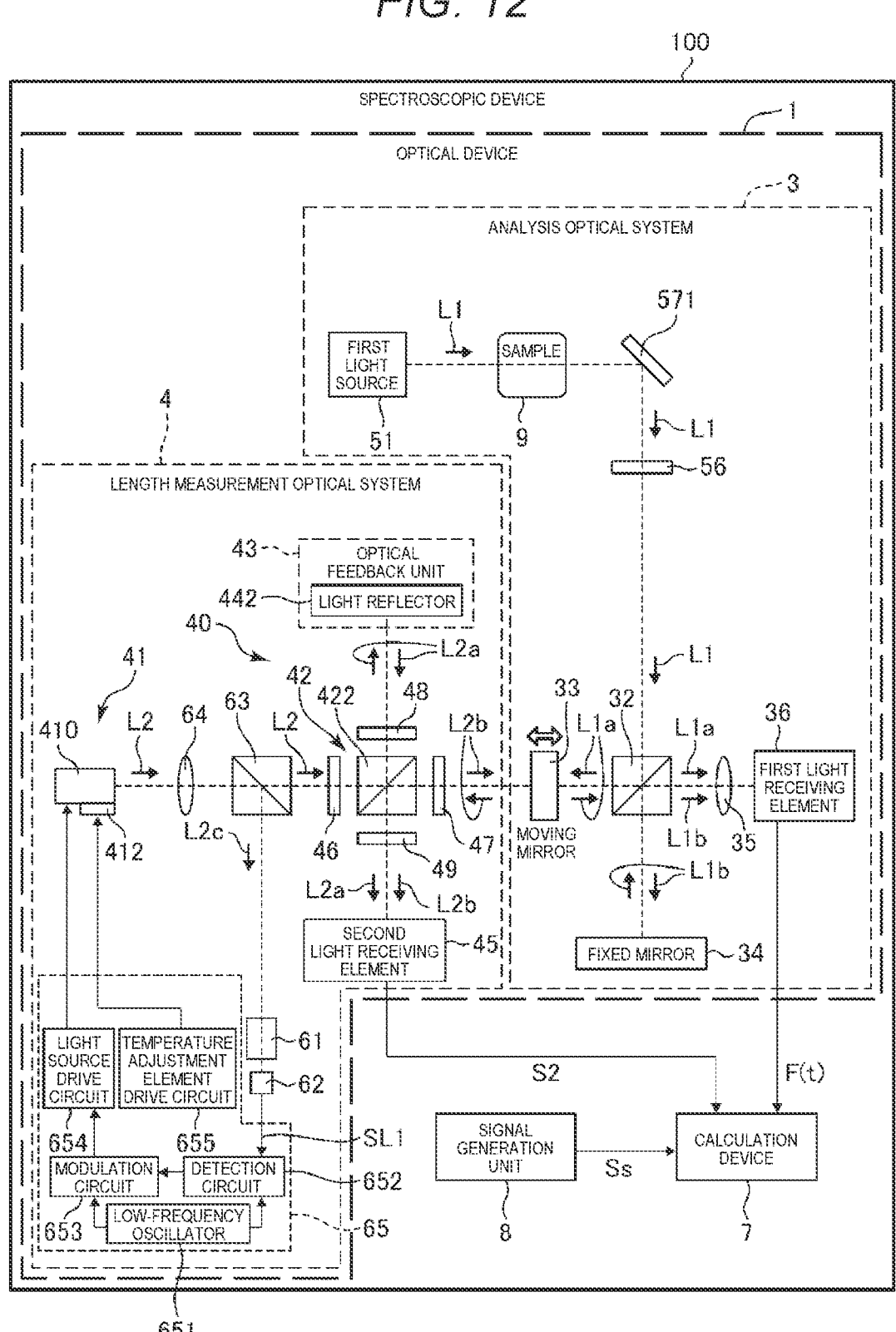
FIG. 12 is a schematic configuration diagram showing a spectroscopic device according to a first modification of the first embodiment.

FIG. 12 is a schematic configuration diagram showing the spectroscopic device 100 according to the first modification of the first embodiment. Hereinafter, the first modification will be described. In the following description, differences from the first embodiment will be mainly described, and the description of similar matters will be omitted. In FIG. 12, the same reference numerals are given to matters the same as those in the first embodiment.

The spectroscopic device 100 shown in FIG. 12 is the same as the spectroscopic device 100 shown in FIG. 1 except that a configuration of the analysis optical system 3 of the optical device 1 is different.

The analysis optical system 3 shown in FIG. 12 includes a mirror 571 instead of the beam splitter 54. The mirror 571 changes an optical path of the analysis light L1 emitted from the first light source 51. The sample 9 is disposed between the first light source 51 and the mirror 571. Accordingly, the analysis light L1 emitted from the first light source 51 passes through the sample 9 and is incident on the mirror 571. Therefore, the spectral pattern obtained in the first modification is a transmission spectrum.

In the first modification described above, effects the same as those of the first embodiment can also be obtained. The mirror 571 may be provided as necessary, and may be omitted depending on the arrangement of the first light source 51 and the sample 9.

3. Second Modification of First Embodiment

Figure 13:
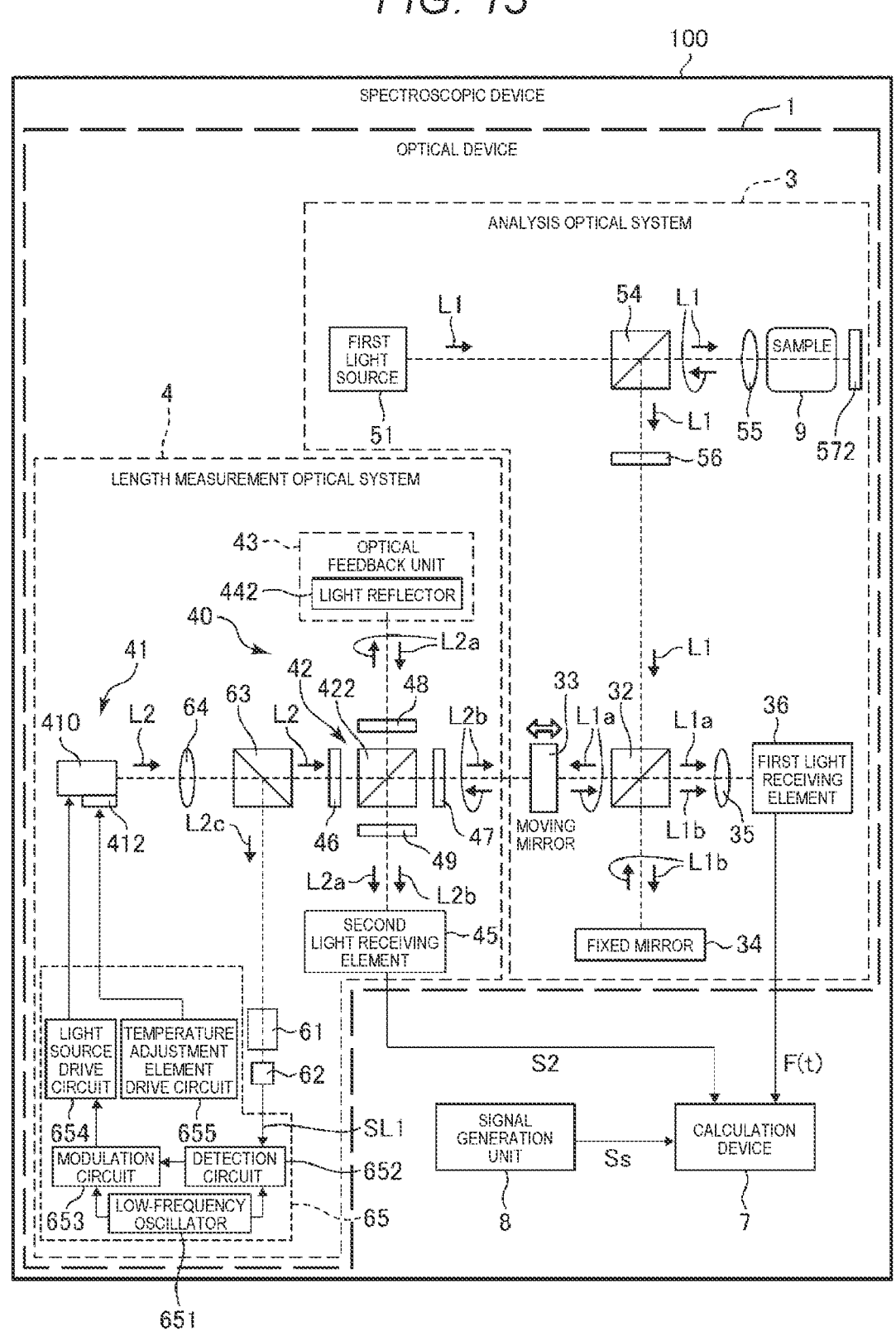
FIG. 13 is a schematic configuration diagram showing a spectroscopic device according to a second modification of the first embodiment.

Next, a spectroscopic device according to a second modification of the first embodiment will be described. FIG. 13 is a schematic configuration diagram showing the spectroscopic device 100 according to the second modification of the first embodiment.

Hereinafter, the second modification will be described. In the following description, differences from the first embodiment will be mainly described, and the description of similar matters will be omitted. In FIG. 13, the same reference numerals are given to matters the same as those in the first embodiment.

The spectroscopic device 100 shown in FIG. 13 is the same as the spectroscopic device 100 shown in FIG. 1 except that a configuration of the analysis optical system 3 of the optical device 1 is different.

The analysis optical system 3 shown in FIG. 13 includes a mirror 572 provided on an opposite side of the condensing lens 55 from the sample 9. The mirror 572 reflects the analysis light L1 transmitted through the sample 9 and causes the analysis light L1 to be incident on the sample 9 again. Therefore, the spectral pattern obtained in the second modification is a transmission spectrum.

In the second modification described above, effects the same as those of the first embodiment can also be obtained. In the analysis optical system 3 shown in FIG. 13, the analysis light L1 emitted from the beam splitter 54 reciprocates through the sample 9 and is returned to the beam splitter 54. Therefore, in the spectral pattern obtained by the spectroscopic device 100 shown in FIG. 13, an intensity of information (peak) derived from the sample can be made larger than that of the spectral pattern obtained by the spectroscopic device 100 shown in FIG. 12, and thus the S/N ratio can be increased.

4. Third Modification of First Embodiment

Figure 14:
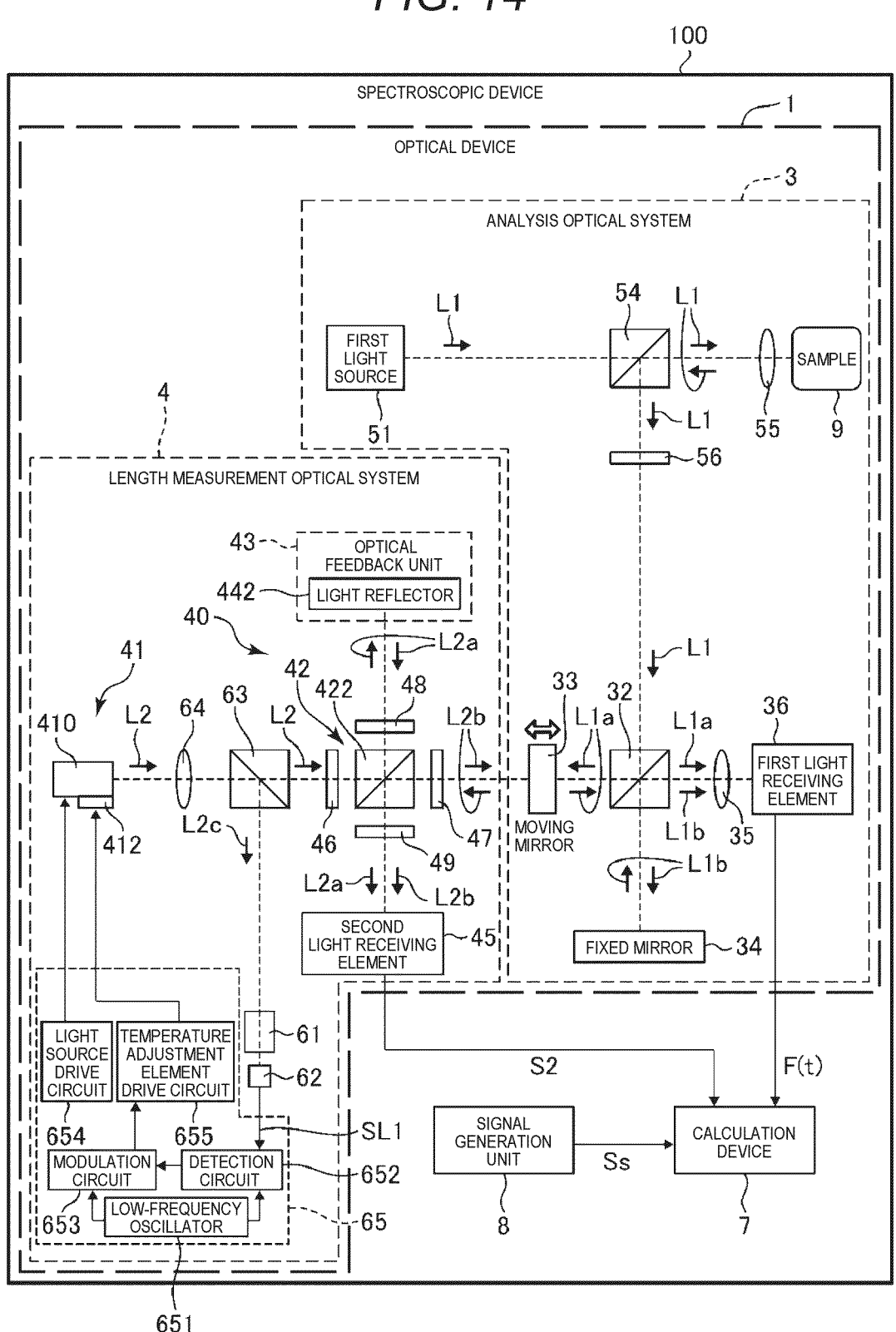
FIG. 14 is a schematic configuration diagram showing a spectroscopic device according to a third modification of the first embodiment.

Next, a spectroscopic device according to a third modification of the first embodiment will be described. FIG. 14 is a schematic configuration diagram showing the spectroscopic device 100 according to the third modification of the first embodiment.

Hereinafter, the third modification will be described. In the following description, differences from the first embodiment will be mainly described, and the description of similar matters will be omitted. In FIG. 14, the same reference numerals are given to matters the same as those in the first embodiment.

The third modification is the same as the above embodiment except that the light source control unit 65 adjusts the temperature of the second light source 41 instead of adjusting the bias current.

In the light source control unit 65 shown in FIG. 14, the signal output from the modulation circuit 653, that is, the error signal to which the modulation is applied is input to the temperature adjustment element drive circuit 655. Meanwhile, the light source drive circuit 654 shown in FIG. 14 fixes the bias current preferably to a constant value. Accordingly, an operation of the temperature adjustment element drive circuit 655 can be prevented from being hindered.

The temperature adjustment element drive circuit 655 shown in FIG. 14 adjusts, using the error signal applied with modulation, the temperature adjustment signal to be input to the temperature adjustment element 412. For example, when the voltage of the error signal is positive, the temperature of the second light source 41 is decreased by causing the temperature adjustment element 412 to absorb heat, and when the voltage of the error signal is negative, the temperature of the second light source 41 is increased by causing the temperature adjustment element 412 to generate heat.

Figure 15:
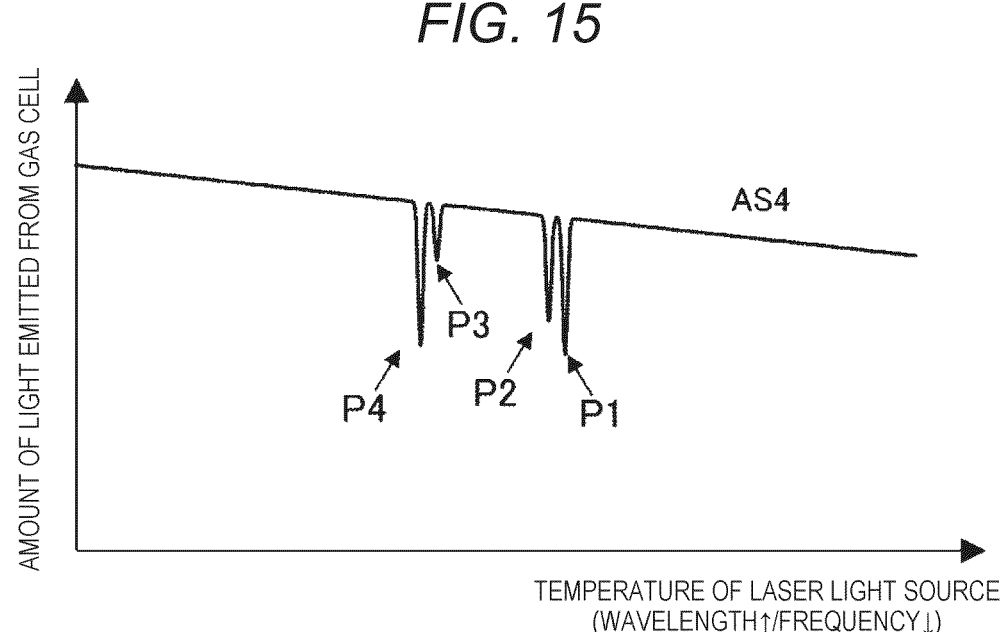
FIG. 15 is an absorption spectrum AS4 showing a relationship between a temperature of the second light source and the amount of light emitted from the gas cell.

FIG. 15 is an absorption spectrum AS4 showing a relationship between a temperature of the second light source 41 and the amount of light emitted from the gas cell 61. In FIG. 15, a horizontal axis indicates the temperature of the second light source 41, and a vertical axis indicates the amount of light emitted from the gas cell 61. When the temperature of the second light source 41 increases, the center wavelength of the length measurement light L2 emitted from the second light source 41 increases and the center frequency decreases, which is thus represented in FIG. 15 by directions of arrows attached to the horizontal axis.

As shown in FIG. 15, when the temperature of the second light source 41 is increased, the amount of light emitted from the gas cell 61 decreases. Therefore, the absorption spectrum AS4 shown in FIG. 15 is basically a monotonically decreasing spectrum. Meanwhile, in the second light source 41, the center wavelength of the length measurement light L2 also changes according to the temperature. Therefore, when the center wavelength (center frequency) of the length measurement light L2c coincides with the above-described four transition frequencies in a process of changing the temperature, the amount of light emitted from the gas cell 61 takes a minimum value. Here, the light source control unit 65 shown in FIG. 14 adjusts the temperature of the second light source 41 such that the amount of light emitted from the gas cell 61 has a minimum value corresponding to any one of the four absorption peaks. As a result, the center wavelength of the length measurement light L2 emitted from the second light source 41 can be stabilized.

According to the above operation, even when the amount of light emitted from the gas cell 61 is shifted from the minimum value, the shift is fed back to the temperature of the second light source 41 and adjusted to approach the minimum value. As a result, the center wavelength (center frequency) of the length measurement light L2 is locked to any peak top of the absorption peaks P1 to P4 and is stabilized.

Figure 16:
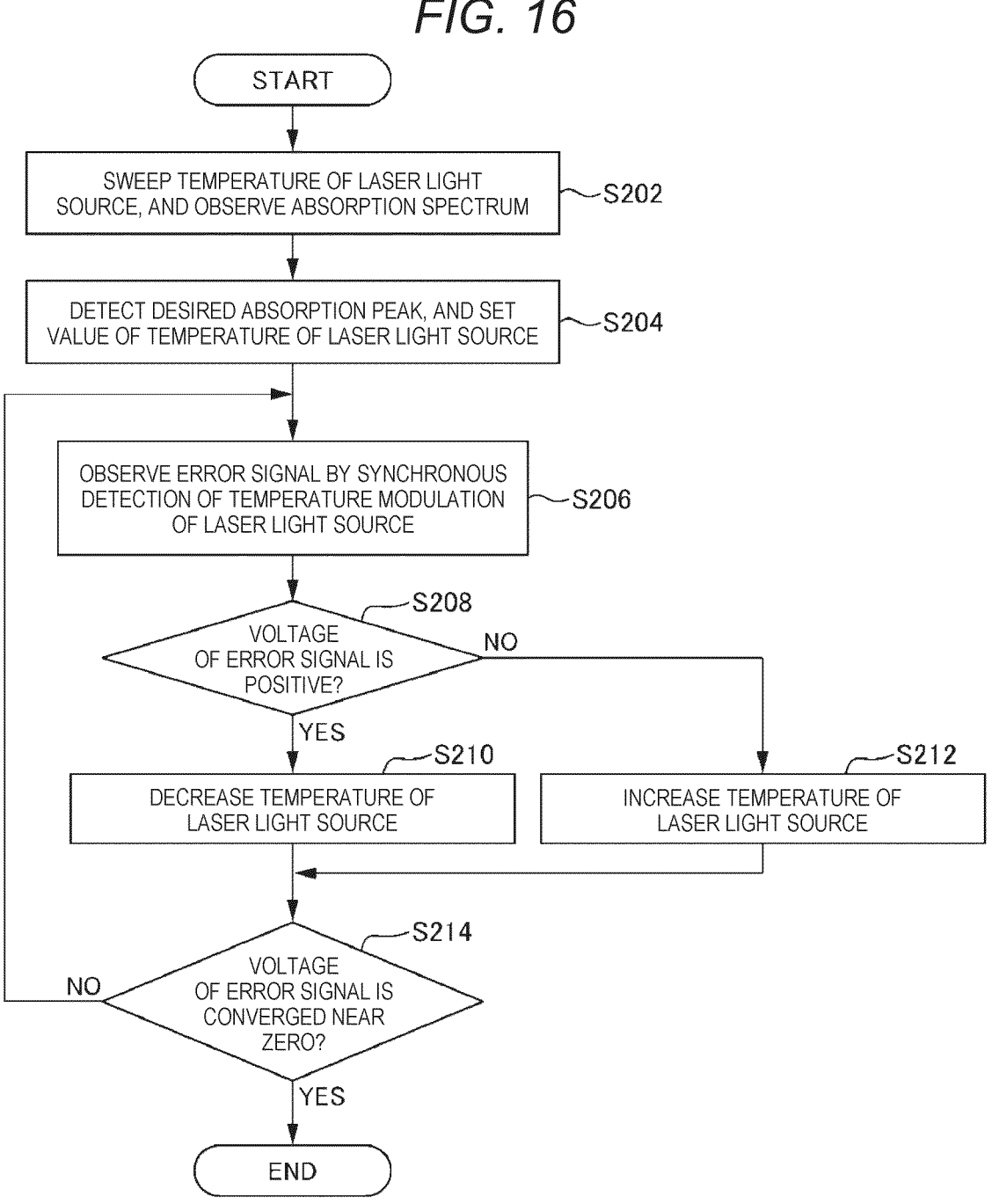
FIG. 16 is a flowchart showing feedback control on the temperature of the second light source.

FIG. 16 is a flowchart showing the feedback control on the temperature of the second light source 41 described above.

In step S202 shown in FIG. 16, the temperature of the second light source 41, which is a laser light source, is swept, and the absorption spectrum is observed.

In step S204, a desired absorption peak is detected, and a value of the temperature of the second light source 41 is set.

In step S206, the error signal is observed by synchronous detection of temperature modulation of the second light source 41.

In step S208, it is determined whether the voltage of the error signal is positive. When the voltage is positive, the processing proceeds to step S210. In step S210, the temperature of the second light source 41 is adjusted to decrease. On the other hand, when the voltage is negative, the processing proceeds to step S212. In step S212, the temperature of the second light source 41 is adjusted to increase.

In step S214, it is determined whether the voltage of the error signal is converged near zero. When the voltage is not converged, the processing returns to step S206. When the voltage is converged, the flow ends.

Then, the above flow is repeated as necessary. Accordingly, the center wavelength (center frequency) of the length measurement light L2 can be stabilized.

In the third modification described above, effects the same as those of the first embodiment can also be obtained. In the third modification, an amount of change in the amount of light when the wavelength of the length measurement light L2 is adjusted by a predetermined amount can be reduced as compared with the first embodiment. Accordingly, it is possible to prevent a change in the amount of interference light incident on the second light receiving element 45 as compared with the first embodiment. As a result, it is possible to prevent variation over time of the S/N ratio (signal-to-noise ratio) of the second light receiving signal S2.

For example, a case in which a general surface emitting laser element is used as the second light source 41 and the center wavelength of the length measurement light L2 is adjusted to be longer by 0.1 nm is considered as an example. Table 3 below shows a change width of the current or the temperature and a change width of the light amount associated with adjustment when the adjustment of increasing the center wavelength of the emitted light L1 by 0.1 nm is performed under the current wavelength control (the above embodiment) and the temperature wavelength control (the third modification) in this example.

TABLE 3

| Control method | Change parameter | Numerical value | Unit |
|---|---|---|---|
| Current wavelength control | Current change | +0.38 | mA |
| | Change in light amount | +11.5 | % |
| Temperature wavelength control | Temperature change | +1.7 | ° C. |
| | Change in light amount | −0.7 | % |

In the first embodiment, it is necessary to increase the bias current by 0.38 mA, and accordingly, the amount of length measurement light L2 increases by 11.5%. Meanwhile, in the third modification, it is necessary to increase the temperature of the second light source 41 by 1.7° C., and accordingly, the amount of length measurement light L2 decreases by 0.7%. As described above, the amount of change in the amount of light in the third modification is reduced to $\frac{1}{10}$ or less of that in the first embodiment.

The above calculation examples were calculated using various parameters of the surface emitting laser element shown in Table 4 below.

TABLE 4

| Parameter | Numerical value | Unit |
|---|---|---|
| Current-wavelength coefficient | 0.26 | nm/mA |
| Current-light output coefficient (Slope efficiency) | 0.6 (When outputting 2 mW) 30 | W/A %/mA |
| Temperature-wavelength coefficient | 0.06 | nm/° C. |
| Temperature-light output coefficient | −0.4 | %/° C. |

5. Fourth Modification of First Embodiment

Figure 17:
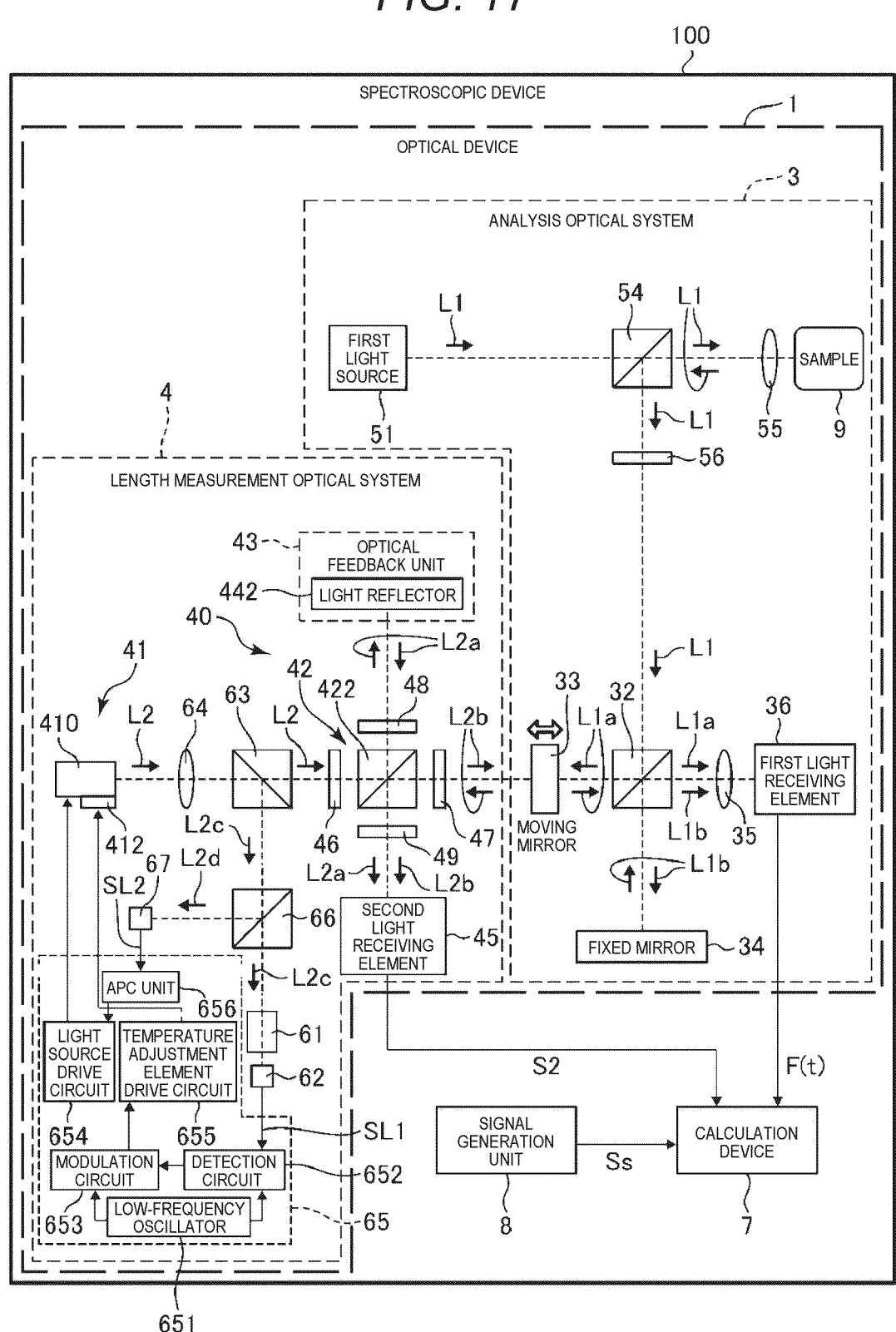
FIG. 17 is a schematic configuration diagram showing a spectroscopic device according to a fourth modification of the first embodiment.

Next, a spectroscopic device according to a fourth modification of the first embodiment will be described. FIG. 17 is a schematic configuration diagram showing the spectroscopic device 100 according to the fourth modification of the first embodiment.

Hereinafter, the fourth modification will be described. In the following description, differences from the third modification will be mainly described, and the description of similar matters will be omitted. In FIG. 17, the same reference numerals are given to matters the same as those in the third modification.

The fourth modification is the same as the third modification except that the light source control unit 65 adjusts the bias current based on the light output of the second light source 41 in addition to adjusting the temperature of the second light source 41.

The length measurement optical system 4 shown in FIG. 17 further includes a beam splitter 66, a light output detection unit 67, and an APC unit 656.

The beam splitter 66 is a non-polarizing beam splitter disposed on an optical path branched by the beam splitter 63. The beam splitter 66 reflects and branches a part of the length measurement light L2*c* to generate length measurement light L2*d*. In addition, the beam splitter 66 transmits a remaining part of the length measurement light L2*c* and causes the transmitted light to be incident on the gas cell 61. A branching ratio is not particularly limited. The arrangement of the beam splitter 66 is not limited to the above.

The light output detection unit 67 detects an amount of the length measurement light L2*d* branched by the beam splitter 66. In this specification, the amount of light is referred to as a "light output of the light emitting element 410". The light output is substantially proportional to the amount of length measurement light L2 emitted from the second light source 41, and is used to monitor the amount of length measurement light L2. The light output detection unit 67 outputs a light output detection signal SL2 corresponding to the amount of length measurement light L2*d*. Examples of the light output detection unit 67 include a photodiode and a phototransistor.

The APC unit 656 outputs a light output control signal for controlling the bias current based on the light output detection signal SL2 such that the light output of the second light source 41 becomes constant. The light source drive circuit 654 shown in FIG. 17 adjusts the bias current based on the light output control signal. APC refers to auto power control.

As described above, in the fourth modification, a configuration of feedback control on the bias current using the APC unit 656 is added to the configuration (feedback control on the temperature) of the third modification. Accordingly, the center wavelength (center frequency) of the length measurement light L2 emitted from the second light source 41 can be stabilized, and the light output (light amount) can be controlled to be constant.

Figure 18:
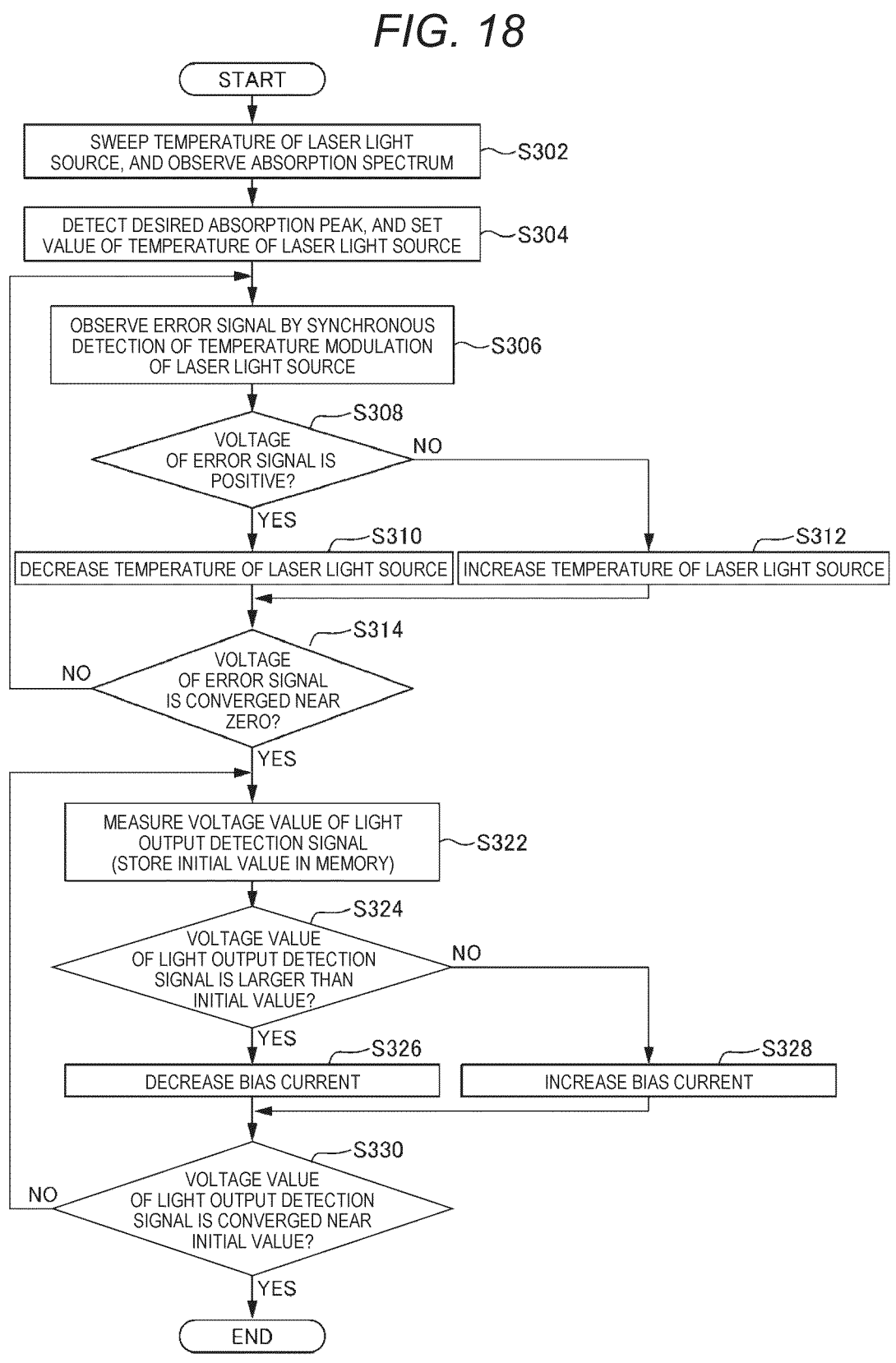
FIG. 18 is a flowchart showing two types of feedback control (feedback control on a temperature and on a bias current).

FIG. 18 is a flowchart showing two types of feedback control described above (feedback control on the temperature and on the bias current).

In step S302 shown in FIG. 18, the temperature of the second light source 41, which is a laser light source, is swept, and the absorption spectrum is observed.

In step S304, a desired absorption peak is detected, and a value of the temperature of the second light source 41 is set.

In step S306, the error signal is observed by synchronous detection of temperature modulation of the second light source 41.

In step S308, it is determined whether the voltage of the error signal is positive. When the voltage is positive, the processing proceeds to step S310. In step S310, the temperature of the second light source 41 is adjusted to decrease. On the other hand, when the voltage is negative, the processing proceeds to step S312. In step S312, the temperature of the second light source 41 is adjusted to increase.

In step S314, it is determined whether the voltage of the error signal is converged near zero. When the voltage is not converged, the processing returns to step S306. When the voltage is converged, the processing proceeds to step S322.

In step S322, a voltage value of the light output detection signal SL2, which is a voltage signal output from the light output detection unit 67, is measured. An initial value of the voltage value is stored in advance in a memory (not shown).

In step S324, it is determined whether the measured voltage value of the light output detection signal SL2 is larger than the initial value. When the measured voltage value is larger than the initial value, the processing proceeds to step S326. In step S326, the bias current is adjusted to decrease. On the other hand, when the measured voltage value is smaller than the initial value, the processing proceeds to step S328. In step S328, the bias current is adjusted to increase.

In step S330, it is determined whether the voltage value of the light output detection signal SL2 is converged near the initial value. When the voltage value is not converged, the processing returns to step S322. When the voltage is converged, the flow ends.

Then, the above flow is repeated as necessary. Accordingly, both the center wavelength (center frequency) of the length measurement light L2 and the light output can be stabilized.

6. Fifth Modification of First Embodiment

Figure 19:
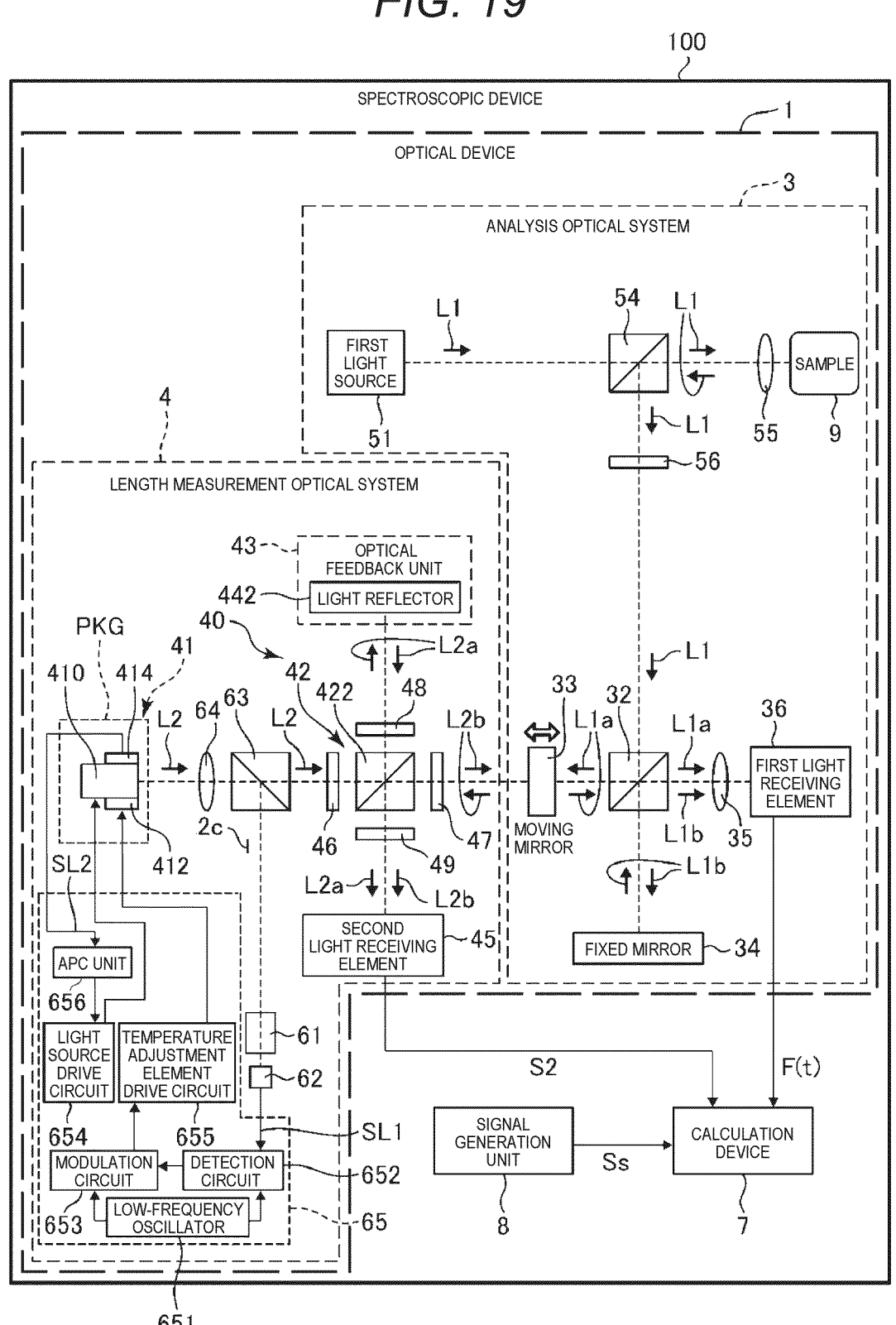
FIG. 19 is a schematic configuration diagram showing a spectroscopic device according to a fifth modification of the first embodiment.

Next, a spectroscopic device according to a fifth modification of the first embodiment will be described. FIG. 19 is a schematic configuration diagram showing the spectroscopic device 100 according to the fifth modification of the first embodiment.

Hereinafter, the fifth modification will be described. In the following description, differences from the fourth modification will be mainly described, and the description of similar matters will be omitted. In FIG. 19, the same reference numerals are given to matters the same as those in the fourth modification.

The fifth modification is the same as the fourth modification except that a light output detection unit 414 is provided inside a package PKG of the second light source 41.

The second light source 41 shown in FIG. 19 further includes the package PKG. The package PKG is a container that accommodates the light emitting element 410, the temperature adjustment element 412, and the light output detection unit 414. The light output detection unit 414 outputs the light output detection signal SL2 corresponding to the amount of length measurement light L2*d*, similarly to the light output detection unit 67 described above. Meanwhile, in the second light source 41 shown in FIG. 19, the light output detection unit 414 is provided inside the package PKG. Accordingly, a size of the spectroscopic device 100 can be further reduced. In the fifth modification described above, effects the same as those of the fourth modification can also be obtained.

7. Sixth Modification of First Embodiment

Next, a spectroscopic device according to a sixth modification of the first embodiment will be described.

Figure 20:
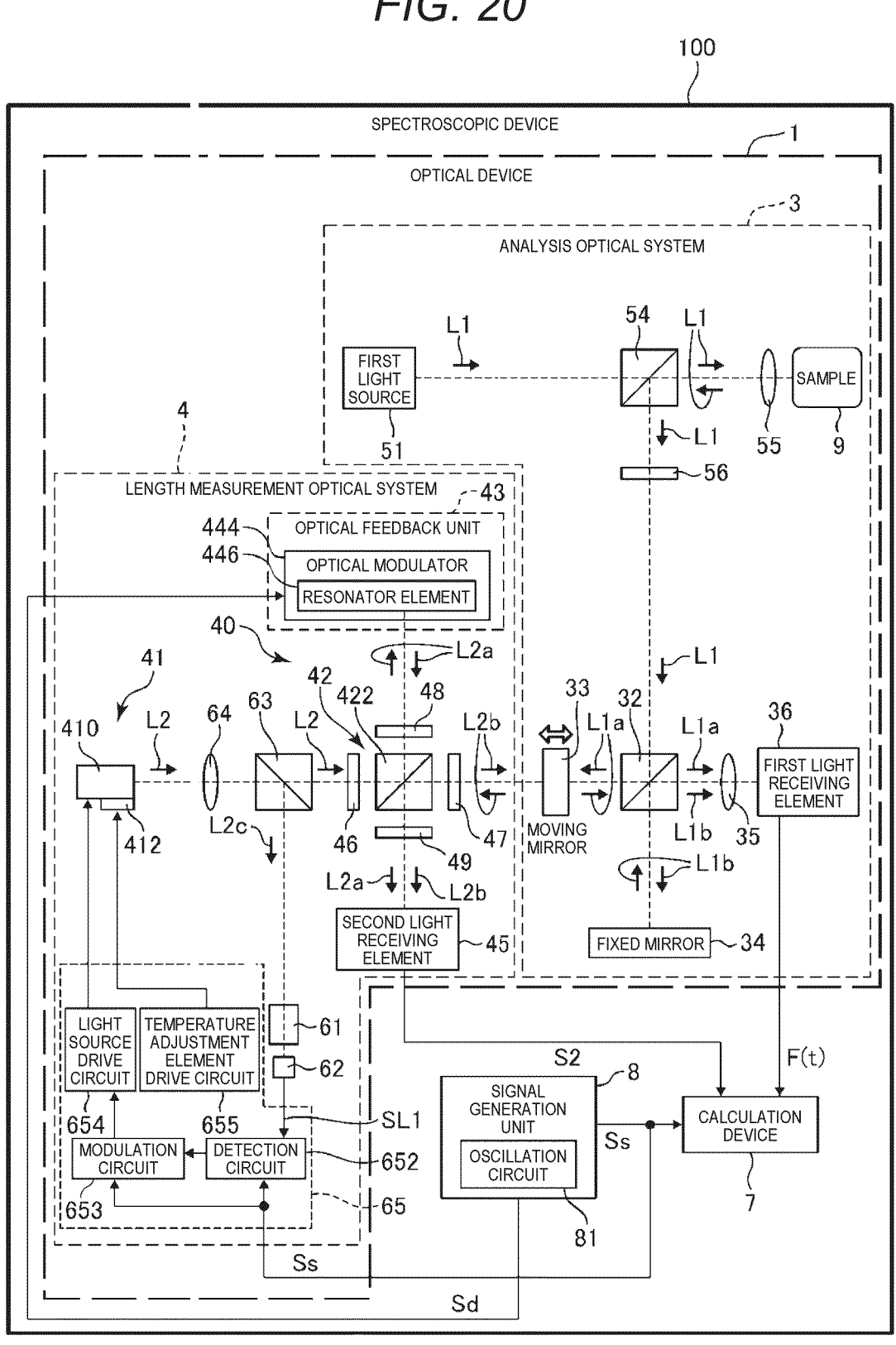
FIG. 20 is a schematic configuration diagram showing a spectroscopic device according to a sixth modification of the first embodiment.
Figure 21:
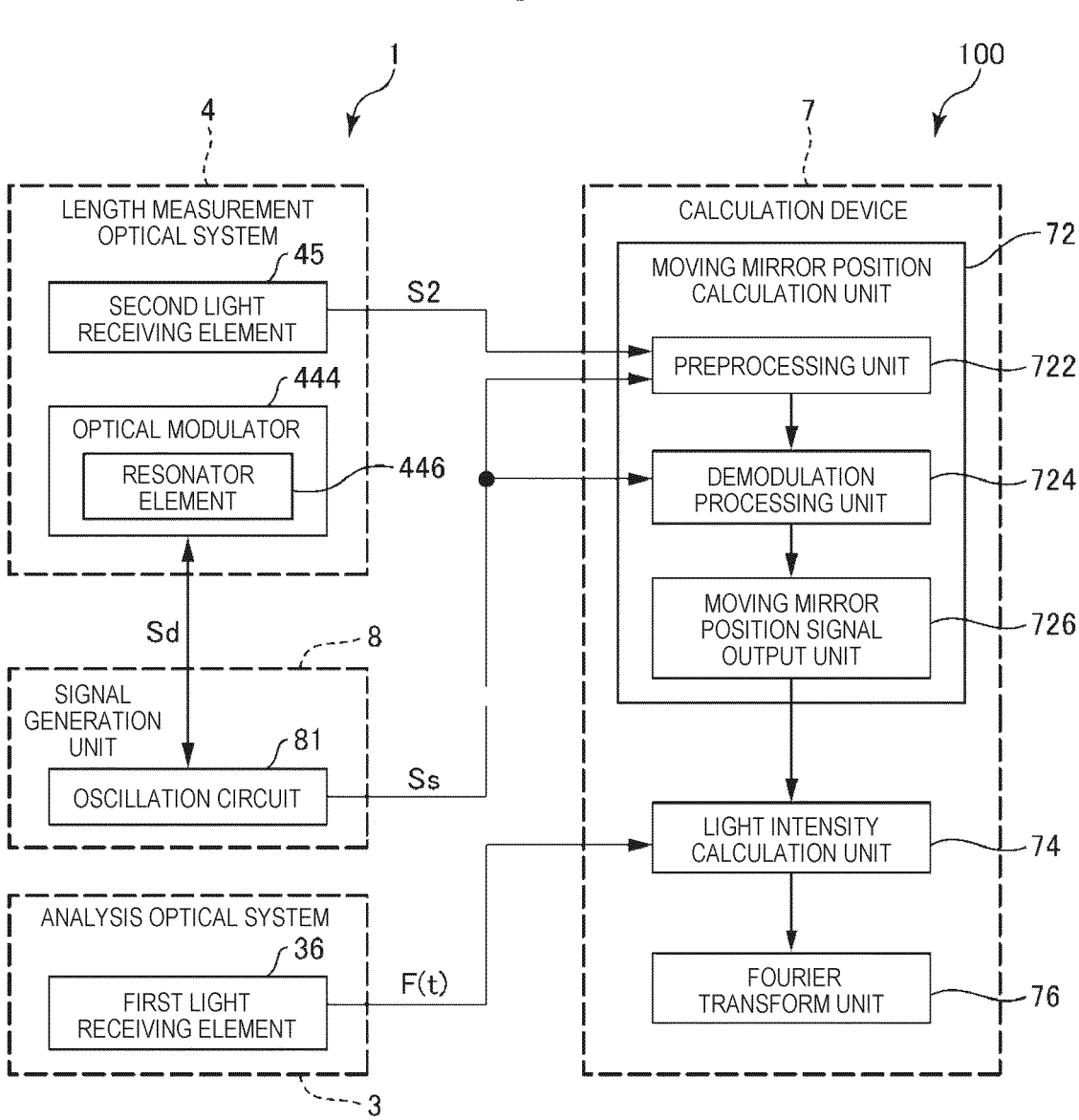
FIG. 21 is a schematic diagram showing main parts of an analysis optical system, a length measurement optical system, a signal generation unit, and a calculation device in FIG. 20.

FIG. 20 is a schematic configuration diagram showing the spectroscopic device 100 according to the sixth modification of the first embodiment. FIG. 21 is a schematic diagram showing main parts of the analysis optical system 3, the length measurement optical system 4, the signal generation unit 8, and the calculation device 7 in FIG. 20.

Hereinafter, the sixth modification will be described. In the following description, differences from the first embodiment will be mainly described, and the description of similar matters will be omitted. In FIG. 20, the same reference numerals are given to matters the same as those in the first embodiment.

The sixth modification is the same as the first embodiment except that the configuration of the optical feedback unit 43 is different and the low-frequency oscillator 651 is omitted.

The optical feedback unit 43 shown in FIG. 20 includes an optical modulator 444. The optical modulator 444 includes a resonator 446. The resonator 446 vibrates in response to a drive signal Sd and reflects the length measurement light L2*a*. Accordingly, the optical modulator 444 superimposes a second modulation signal on the length measurement light L2*a*. The second modulation signal is a change in frequency that occurs when the length measurement light L2*a* is reflected by the resonator 446.

The signal generation unit 8 shown in FIG. 20 includes an oscillation circuit 81. The oscillation circuit 81 operates with the resonator 446 as a signal source and generates a highly accurate periodic signal. Accordingly, the oscillation circuit 81 outputs the reference signal Ss while outputting the highly accurate drive signal Sd. Therefore, the drive signal Sd and the reference signal Ss are influenced in the same way when subjected to a disturbance. As a result, the second modulation signal added via the resonator 446 driven by the drive signal Sd and the reference signal Ss are also influenced in the same way. Therefore, when the second light receiving signal S2 and the reference signal Ss are subjected to calculation in the calculation device 7, the influence of disturbances contained in both signals can be canceled out or reduced in the process of calculation. As a result, the calculation device 7 can determine the position of the moving mirror 33 with higher accuracy even when subjected to the disturbance.

Examples of the resonator 446 include a quartz crystal resonator, a silicon resonator, and a ceramic resonator. These resonators are resonators that utilize a mechanical resonance phenomenon, and therefore have a high Q value and can easily stabilize a natural frequency. Accordingly, the S/N ratio of the second modulation signal applied to the length measurement light L2 by the optical modulator 444 can be increased, and accuracy of the reference signal Ss can be enhanced. Accordingly, the position of the moving mirror 33 can be determined with higher accuracy, and finally, the spectroscopic device 100 capable of generating a spectral pattern with high accuracy on the wavelength axis (wavenumber axis) can be implemented.

Examples of the quartz crystal resonator include a quartz crystal AT resonator, an SC-cut quartz crystal resonator, a tuning fork-type quartz crystal resonator, and a quartz crystal surface acoustic wave element. An oscillation frequency of the quartz crystal resonator is, for example, about 1 kHz to several hundreds of MHz.

A silicon resonator is a resonator including a single crystal silicon piece manufactured from a single crystal silicon substrate using a MEMS technique and a piezoelectric film. The MEMS is a micro electro mechanical system. Examples of a shape of the single crystal silicon piece include cantilever beam shapes such as a two-legged tuning fork type and a three-legged tuning fork type, and a fixed beam shape. An oscillation frequency of the silicon resonator is, for example, about 1 kHz to several hundreds of MHz.

A ceramic resonator is a resonator including an electrode and a piezoelectric ceramic piece manufactured by firing a piezoelectric ceramic. Examples of the piezoelectric ceramic include lead zirconate titanate (PZT) and barium titanate (BTO). An oscillation frequency of the ceramic resonator is, for example, about several hundreds kHz to several tens of MHz.

Examples of the resonator 446 and the oscillation circuit 81 include a resonator and an oscillation circuit disclosed in JP-A-2022-38156.

The moving mirror position calculation unit 72 shown in FIG. 21 identifies the position of the moving mirror 33 based on an optical heterodyne interferometry, and generates the moving mirror position signal X(t) based on a result thereof. Specifically, since the length measurement optical system 4 includes the optical modulator 444, it is possible to add the second modulation signal to the length measurement light L2*a*. In this way, when the length measurement light L2*a* and L2*b* interfere with each other, phase information corresponding to the position of the moving mirror 33 can be obtained with higher accuracy based on the obtained interference light. The position of the moving mirror 33 is determined with high accuracy based on the phase information in the calculation device 7. According to the optical heterodyne interferometry, extraction of the phase information is less susceptible to the influence of disturbances, in particular, the influence of stray light having a frequency that becomes noise, and has high robustness.

The moving mirror position calculation unit 72 shown in FIG. 21 includes a preprocessing unit 722, a demodulation processing unit 724, and a moving mirror position signal output unit 726. The preprocessing unit 722 and the demodulation processing unit 724 may be, for example, a preprocessing unit and a demodulation unit disclosed in JP-A-2022-38156.

The preprocessing unit 722 performs preprocessing on the second light receiving signal S2 based on the reference signal Ss. The demodulation processing unit 724 demodulates a displacement signal corresponding to the position of the moving mirror 33 based on the reference signal Ss from a preprocessed signal output from the preprocessing unit 722.

The moving mirror position signal output unit 726 generates and outputs the moving mirror position signal X(t) based on the displacement signal of the moving mirror 33 demodulated by the demodulation processing unit 724. The moving mirror position signal X(t) determined by the method is a signal representing the position of the moving mirror 33 that changes at each time point. The displacement signal of the moving mirror 33 included in the second light receiving signal S2 captures the displacement of the moving mirror 33 at an interval sufficiently narrower than a wavelength of the length measurement light L2. For example, when the wavelength of the length measurement light L2 is several hundred of nanometers, a position resolution of the moving mirror 33 indicated by the displacement signal can be less than 10 nm. Meanwhile, in the first embodiment, $\frac{1}{4}$ of the wavelength of the length measurement light L2 is a limit of the position resolution. Therefore, the light intensity calculation unit 74 can generate digital data of the interferogram F(x) at shorter intervals as compared with the first embodiment.

Figure 22:
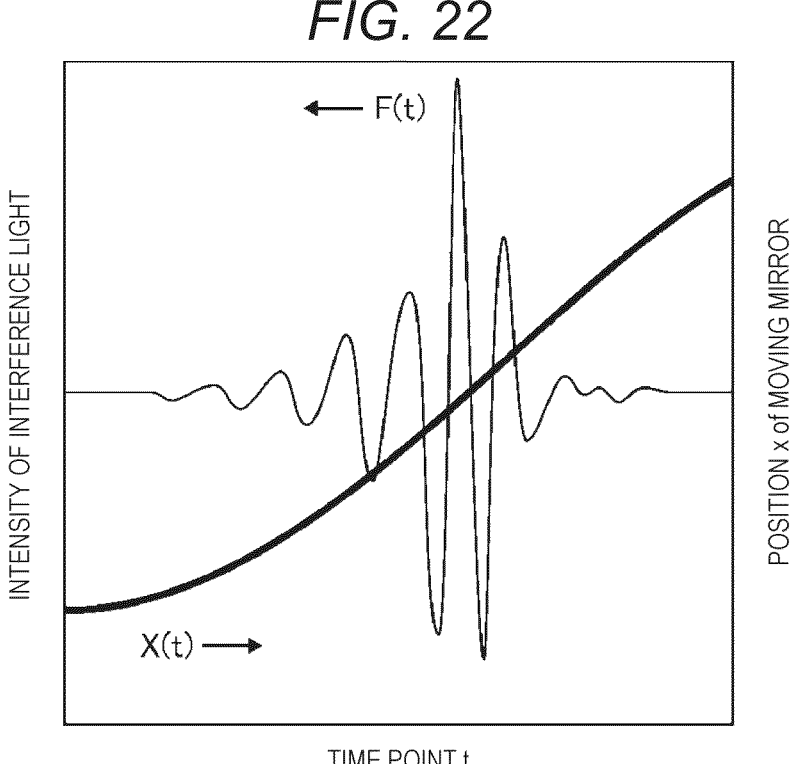
FIG. 22 is a diagram showing an example of a first light receiving signal F(t) and a moving mirror position signal X(t) obtained by the spectroscopic device shown in FIG. 20.

FIG. 22 is a diagram showing an example of the first light receiving signal F(t) and the moving mirror position signal X(t) obtained by the spectroscopic device 100 shown in FIG. 20. A horizontal axis in FIG. 22 indicates a time point, and a vertical axis indicates the intensity of the interference light incident on the first light receiving element 36 or the position of the moving mirror 33.

The moving mirror position signal X(t) shown in FIG. 22 is a signal in which changes in the position of the moving mirror 33 can be detected continuously, and can implement high position resolution. Therefore, by generating the interferogram F(x) based on the moving mirror position signal X(t), the interferogram F(x) having a larger number of data points is obtained. The number of data points means a short sampling interval of the interferogram F(x) and high accuracy. Therefore, by using the interferogram F(x) thus obtained, a spectral pattern having a high resolution can be finally obtained.

In addition, since the sampling interval can be shortened, the interferogram F(x) having a sufficient number of data points can be obtained even when the analysis light L1 having a shorter wavelength (having a larger wavenumber) is used. Accordingly, it is possible to obtain a spectral pattern in a wider wavelength range (wide wavenumber range), that is, a spectral pattern in a wider band.

In the light source control unit 65 shown in FIG. 20, the above-described low-frequency oscillator 651 is omitted. The reference signal Ss generated by the oscillation circuit 81 is used as the low-frequency signal to be input to each of the detection circuit 652 and the modulation circuit 653. Accordingly, the configuration of the light source control unit 65 can be simplified as compared with the above embodiment, and the size of the spectroscopic device 100 can be reduced and a cost can be reduced.

In the sixth modification described above, effects the same as those of the first embodiment can also be obtained. The optical modulator 444 may be replaced by an acousto-optics modulator (AOM), an electro-optic modulator (EOM), or the like. Meanwhile, the optical modulator 444 can benefit from the resonator 446 because the resonator 446 has characteristics such as small size, weight, and low power consumption. Therefore, according to the sixth modification, it is possible to reduce the size, weight, and power consumption of the spectroscopic device 100.

Although the modification is an example in which the low-frequency oscillator 81 is omitted, a signal output from the low-frequency oscillator 81 may be used as in other modifications, instead of using the reference signal Ss. That is, a configuration example in which the low-frequency oscillator 81 is added to the modification is also one of the modifications.

8. Second Embodiment

Next, a shape measurement device according to a second embodiment will be described.

Figure 23:
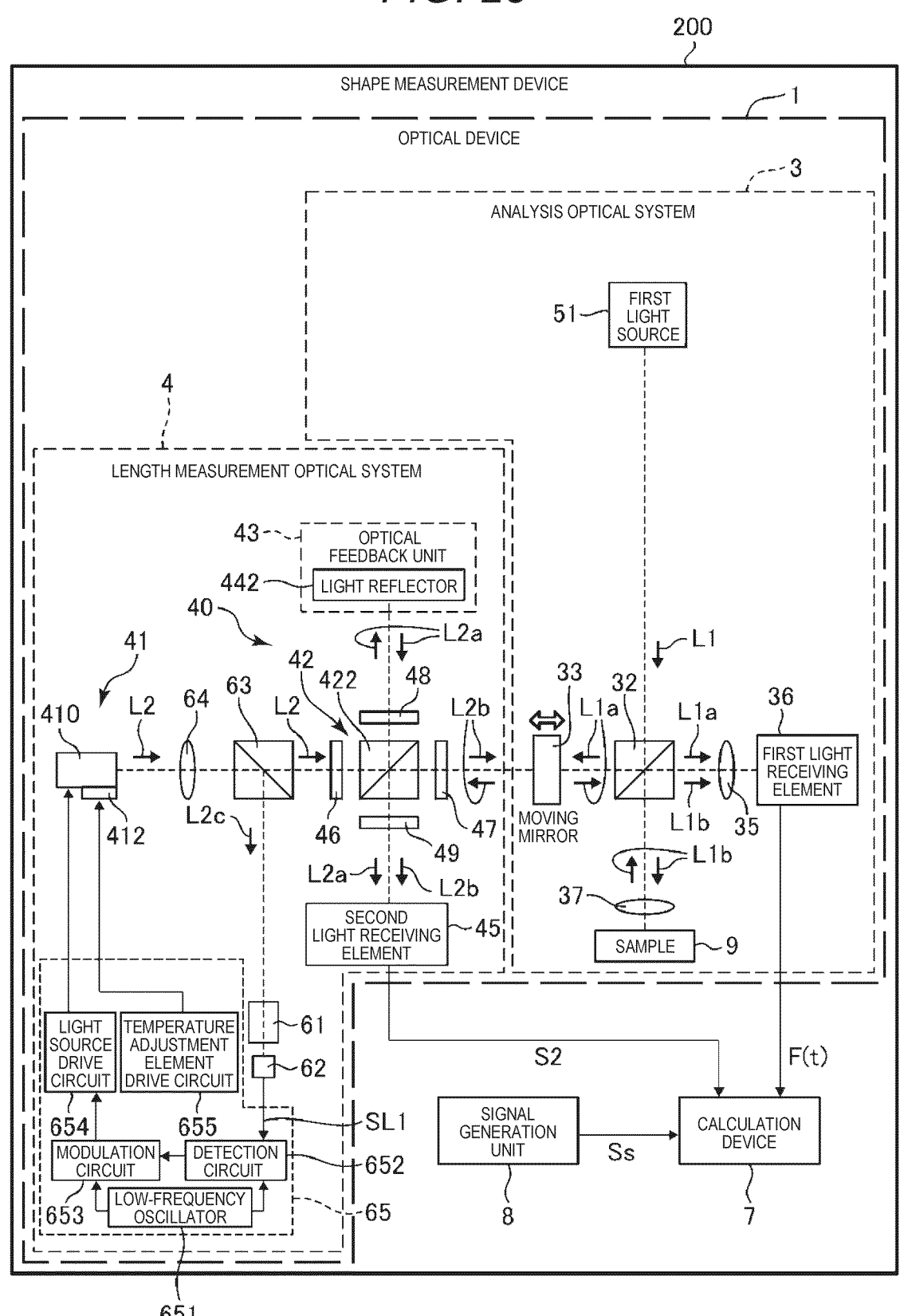
FIG. 23 is a schematic configuration diagram showing a shape measurement device according to a second embodiment.
Figure 24:
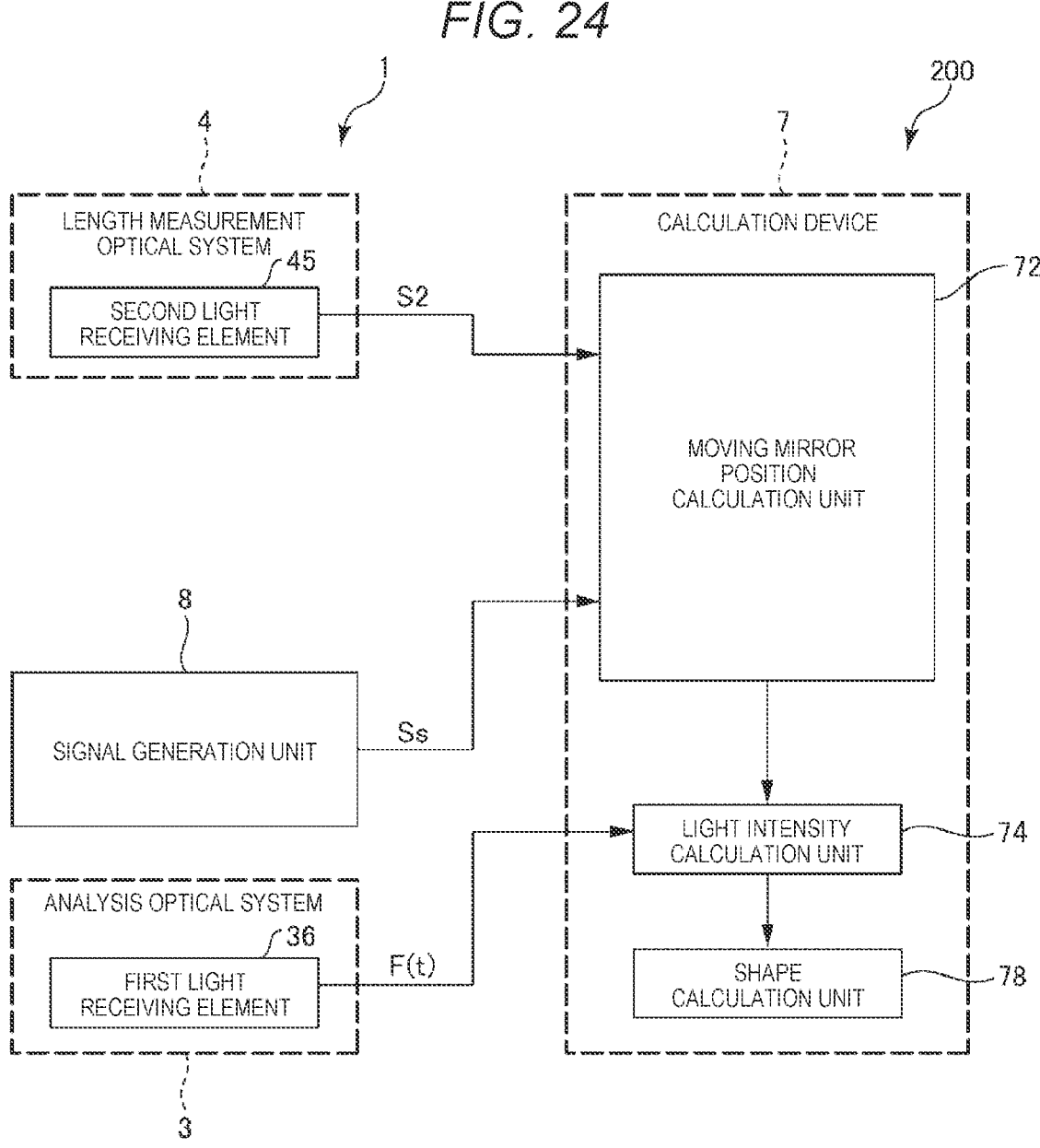
FIG. 24 is a schematic diagram showing main parts of an analysis optical system, a length measurement optical system, a signal generation unit, and a calculation device in FIG. 23.

FIG. 23 is a schematic configuration diagram showing a shape measurement device 200 according to the second embodiment. FIG. 24 is a schematic diagram showing main parts of the analysis optical system 3, the length measurement optical system 4, the signal generation unit 8, and the calculation device 7 in FIG. 23.

Hereinafter, the second embodiment will be described. In the following description, differences from the first embodiment will be mainly described, and the description of similar matters will be omitted. In FIGS. 23 and 24, the same reference numerals are given to matters the same as those in the first embodiment.

The spectroscopic device 100 according to the first embodiment is a device that irradiates the sample 9 with the analysis light L1 emitted from the first light source 51 and performs spectroscopy on the sample 9. Meanwhile, the shape measurement device 200 according to the second embodiment is a device that irradiates the sample 9 with the analysis light L1 and measures a shape of a front surface or inside of the sample 9. The shape measurement device 200 shown in FIG. 23 is the same as the spectroscopic device 100 shown in FIG. 1 except that a configuration of the analysis optical system 3 is different.

The analysis optical system 3 shown in FIG. 23 includes the first light source 51, the beam splitter 32, the moving mirror 33, the condensing lens 35, a condensing lens 37, and the first light receiving element 36.

Examples of the first light source 51 shown in FIG. 23 include a white light source such as a super luminescent diode (SLD) and a light emitting diode (LED); a wavelength swept light source; and various lamps described in the first embodiment. Preferably, a broadband light source called a low-coherence light source is used.

The analysis light L1 emitted from the first light source 51 is split into two parts by the beam splitter 32. The beam splitter 32 shown in FIG. 23 reflects a part of the analysis light L1 toward the moving mirror 33 as the analysis light L1a and transmits the other part of the analysis light L1 toward the sample 9 as the analysis light Lib. The analysis light L1b is condensed on the sample 9 through the condensing lens 37.

In addition, the beam splitter 32 transmits the analysis light L1a reflected by the moving mirror 33 toward the first light receiving element 36, and reflects the analysis light L1b reflected by the sample 9 toward the first light receiving element 36. Therefore, the beam splitter 32 mixes the split analysis light L1a and Lib.

The first light receiving element 36 receives the interference light and obtains an intensity thereof. A signal indicating a temporal change in intensity is output as a first light receiving signal F(t). The first light receiving signal F(t) includes the sample-derived signal generated by an interaction between the analysis light L1b and the sample 9, and the above-described first modulation signal. The sample-derived signal is, for example, a change in phase added to the analysis light L1b according to a surface shape of the sample 9.

Examples of the first light receiving element 36 include a photodiode; a phototransistor; and an image sensor such as a charge coupled device (CCD) and a complementary metal oxide semiconductor (CMOS). By using an image sensor, a two-dimensional distribution of the first light receiving signal F(t) can be obtained. Accordingly, the surface shape of the sample 9 can be two-dimensionally measured. The length measurement optical system 4 and the signal generation unit 8 shown in FIG. 23 are the same as those in FIG. 1.

The calculation device 7 shown in FIG. 24 includes the moving mirror position calculation unit 72, the light intensity calculation unit 74, and a shape calculation unit 78.

Similarly to the first embodiment, the light intensity calculation unit 74 shown in FIG. 24 generates, based on the first light receiving signal F(t) and the moving mirror position signal X(t), a waveform representing the intensity of the first light receiving signal F(t) at each position of the moving mirror 33. The shape calculation unit 78 shown in FIG. 24 calculates the surface shape of the sample 9 based on the waveform. For example, when the intensity of the first light receiving signal F(t) (the intensity of the interference light) is maximized, an optical path length of the analysis light L1a and an optical path length of the analysis light L1b are equal to each other. Since the optical path length of the analysis light L1a can be measured with high accuracy using the length measurement optical system 4 including the gas cell 61, the optical path length of the analysis light L1b can also be measured with high accuracy. Accordingly, the surface shape of the sample 9 can be measured with high accuracy. Specific analysis methods are known under names such as white light interference measurement method and time domain optical coherence tomography (OCT).

Although FIG. 23 shows a case in which the sample 9 reflects the analysis light L1b, when the sample 9 transmits the analysis light L1b, the shape measurement device 200 shown in FIG. 23 can measure an internal shape (internal structure) of the sample 9. Specific analysis methods are known under names such as optical coherence tomography. In the second embodiment described above, effects the same as those of the first embodiment can also be obtained.

9. First Modification of Second Embodiment

Next, a shape measurement device according to a first modification of the second embodiment will be described.

Figure 25:
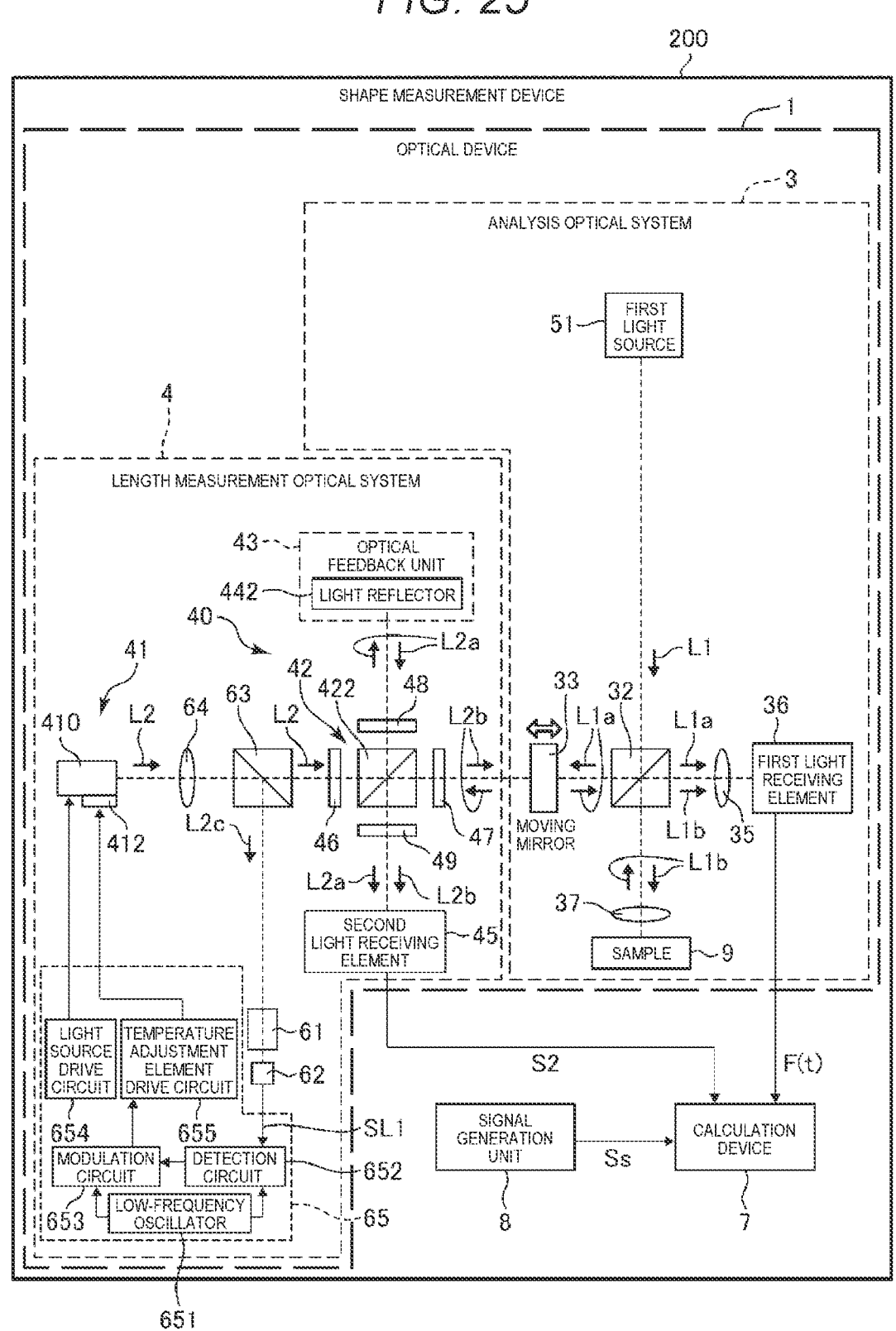
FIG. 25 is a schematic configuration diagram showing a shape measurement device according to a first modification of the second embodiment.

FIG. 25 is a schematic configuration diagram showing the shape measurement device 200 according to the first modification of the second embodiment.

Hereinafter, the first modification will be described. In the following description, differences from the second embodiment will be mainly described, and the description of similar matters will be omitted. In FIG. 25, the same reference numerals are given to matters the same as those in the second embodiment.

The first modification is the same as the second embodiment except that the light source control unit 65 adjusts the temperature of the second light source 41 instead of adjusting the bias current. That is, in the first modification, the configuration of the third modification of the first embodiment is added to the second embodiment.

In the first modification, the position of the moving mirror 33 can also be measured with high accuracy using the length measurement optical system 4 as in the second embodiment, and thus the shape measurement device 200 capable of measuring the surface shape or the internal shape of the sample 9 with high accuracy can be implemented.

In addition, in the first modification, it is possible to prevent a change in the amount of interference light incident on the second light receiving element 45 as compared with the second embodiment. As a result, it is possible to prevent variation over time of the S/N ratio (signal-to-noise ratio) of the second light receiving signal S2, and it is possible to further improve the accuracy of the shape measurement device 200.

10. Second Modification of Second Embodiment

Next, a shape measurement device according to a second modification of the second embodiment will be described.

Figure 26:
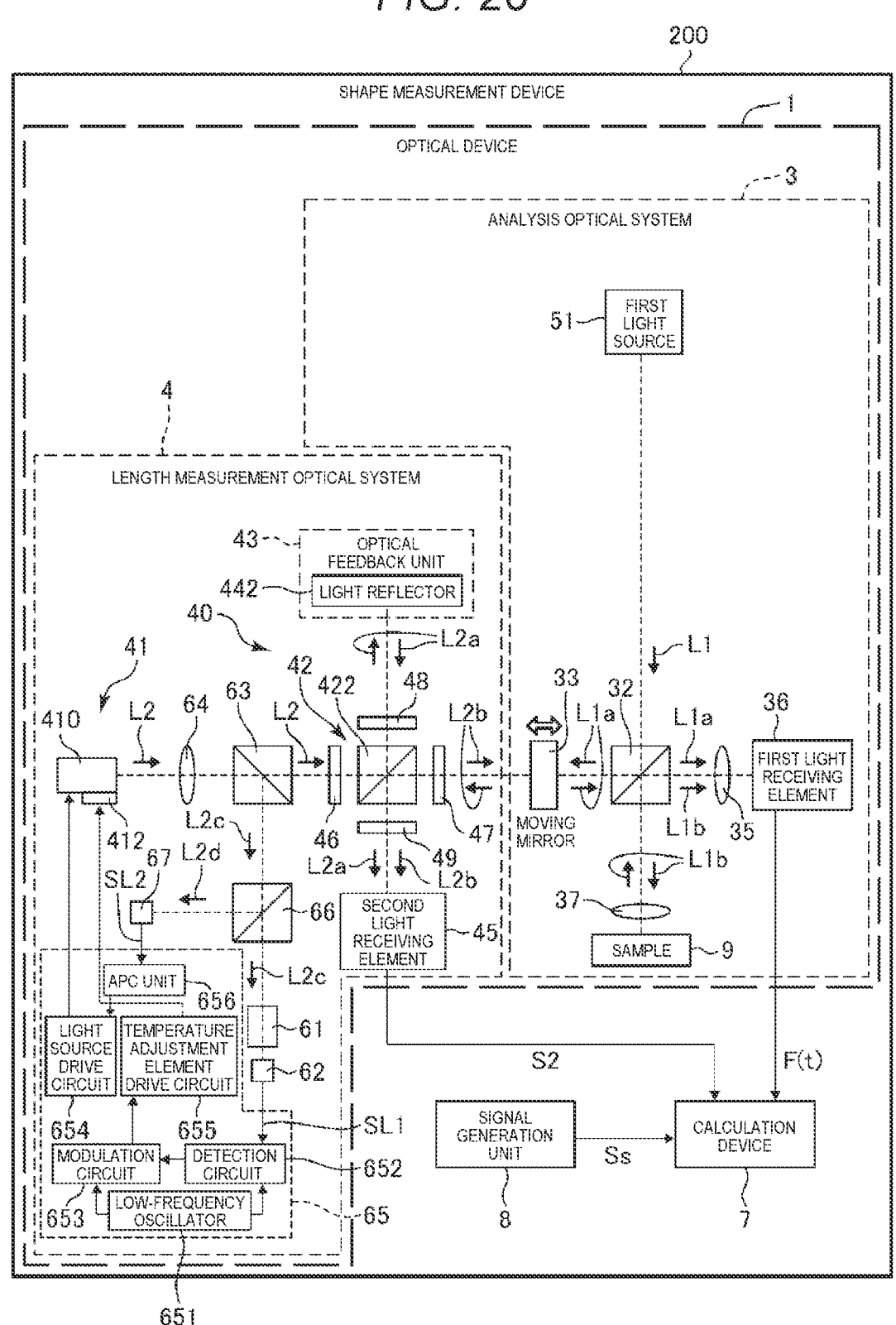
FIG. 26 is a schematic configuration diagram showing a shape measurement device according to a second modification of the second embodiment.

FIG. 26 is a schematic configuration diagram showing the shape measurement device 200 according to the second modification of the second embodiment.

Hereinafter, the second modification will be described. In the following description, differences from the first modification will be mainly described, and the description of similar matters will be omitted. In FIG. 26, the same reference numerals are given to matters the same as those in the first modification.

The second modification is the same as the first modification except that the light source control unit 65 adjusts the bias current based on the light output of the second light source 41 in addition to adjusting the temperature of the second light source 41. That is, in the second modification, the configuration of the fourth modification of the first embodiment is added to the second embodiment.

In the second modification, the position of the moving mirror 33 can also be measured with high accuracy using the length measurement optical system 4 as in the second embodiment, and thus the shape measurement device 200 capable of measuring the surface shape or the internal shape of the sample 9 with high accuracy can be implemented.

In the second modification, the center wavelength (center frequency) of the length measurement light L2 emitted from the second light source 41 can be stabilized, and the light output can be controlled to be constant. Accordingly, both the center wavelength (center frequency) of the length measurement light L2 and the light output can be stabilized.

11. Third Modification of Second Embodiment

Next, a shape measurement device according to a third modification of the second embodiment will be described.

Figure 27:
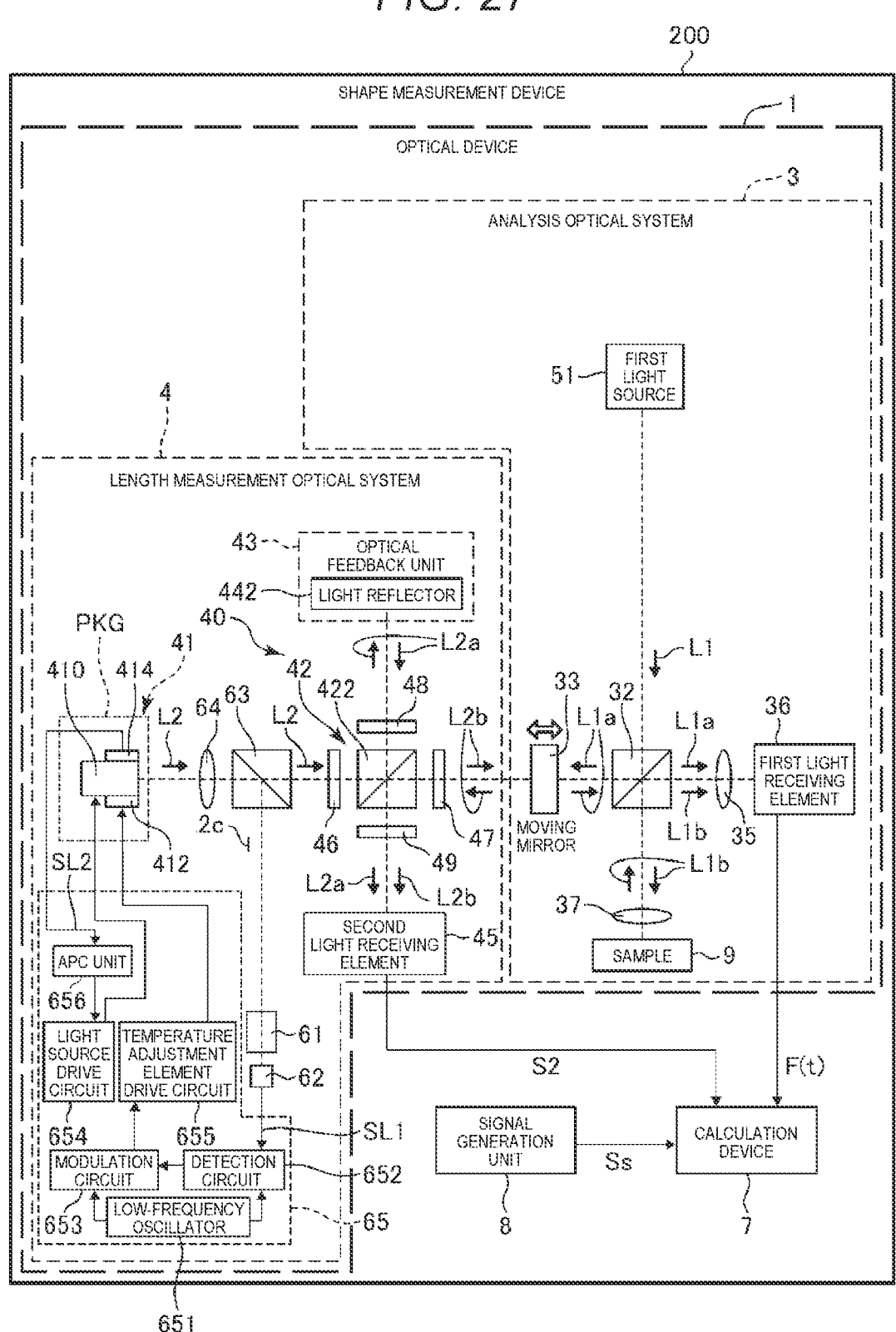
FIG. 27 is a schematic configuration diagram showing a shape measurement device according to a third modification of the second embodiment.

FIG. 27 is a schematic configuration diagram showing the shape measurement device 200 according to the third modification of the second embodiment.

Hereinafter, the third modification will be described. In the following description, differences from the second modification will be mainly described, and the description of similar matters will be omitted. In FIG. 27, the same reference numerals are given to matters the same as those in the second modification.

The third modification is the same as the second modification except that the light output detection unit 414 is provided inside the package PKG of the second light source 41. That is, in the third modification, the configuration of the fifth modification of the first embodiment is added to the second embodiment.

In the third modification described above, effects the same as those of the second modification can also be obtained. In the third modification, the light output detection unit 414 is provided inside the package PKG. Accordingly, a size of the shape measurement device 200 can be further reduced.

12. Fourth Modification of Second Embodiment

Next, a shape measurement device according to a fourth modification of the second embodiment will be described.

Figure 28:
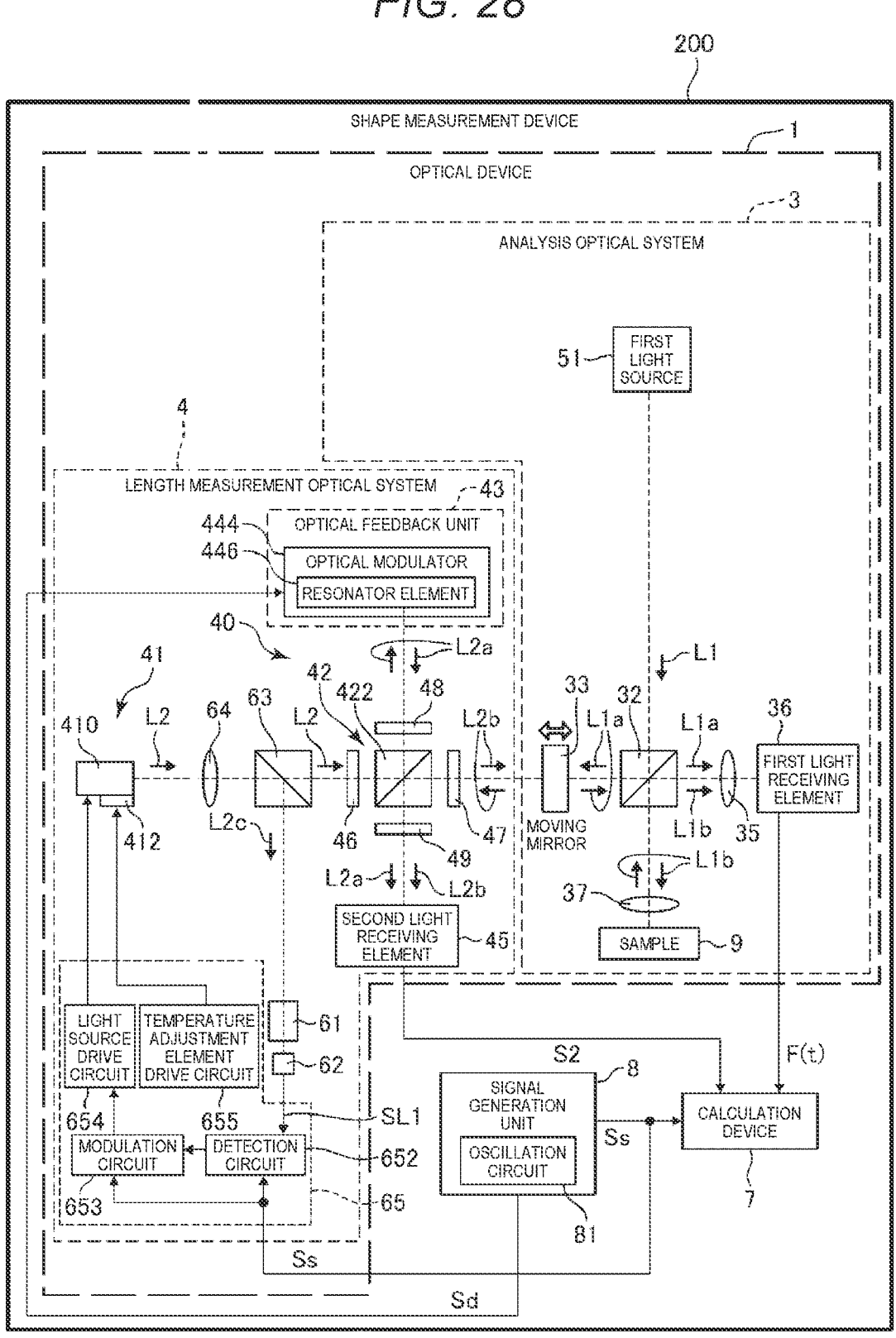
FIG. 28 is a schematic configuration diagram showing a shape measurement device according to a fourth modification of the second embodiment.

FIG. 28 is a schematic configuration diagram showing the shape measurement device 200 according to the fourth modification of the second embodiment.

Hereinafter, the fourth modification will be described. In the following description, differences from the second embodiment will be mainly described, and the description of similar matters will be omitted. In FIG. 28, the same reference numerals are given to matters the same as those in the second embodiment.

The fourth modification is the same as the second embodiment except that the configuration of the optical feedback unit 43 is different and the low-frequency oscillator 651 is omitted. That is, in the fourth modification, the configuration of the sixth modification of the first embodiment is added to the second embodiment.

In the fourth modification described above, effects the same as those of the second embodiment can also be obtained. In the fourth modification, since the length measurement optical system 4 includes the optical modulator 444, the position of the moving mirror 33 can be measured with higher accuracy. Accordingly, it is possible to implement the shape measurement device 200 capable of measuring the surface shape and or internal shape of the sample 9 with particularly high accuracy.

13. Effects of Embodiments

The spectroscopic device 100 according to the embodiments includes the analysis optical system 3, the length measurement optical system 4, and the calculation device 7.

The analysis optical system 3 includes the moving mirror 33 and the first light receiving element 36. The moving mirror 33 reflects analysis light emitted from the first light source 51 to add a first modulation signal. The first light receiving element 36 receives the analysis light including a sample-derived signal generated by an action of the analysis light emitted from the first light source 51 and the sample 9 and the first modulation signal, and outputs the first light receiving signal F(t).

The length measurement optical system 4 includes the second light source 41, the gas cell 61, the emitted light amount detection unit 62, the light source control unit 65, and the length measurement unit 40. The second light source 41 emits length measurement light which is laser light. In the gas cell 61, a gas that absorbs light of a predetermined wavelength is sealed, and the length measurement light is incident on the gas cell 61. The emitted light amount detection unit 62 detects an amount of the light emitted from the gas cell 61, and outputs the emitted light amount detection signal SL1. The light source control unit 65 controls the wavelength of the length measurement light based on the emitted light amount detection signal SL1. The length measurement unit 40 obtains a displacement signal corresponding to a position of the moving mirror 33 using the length measurement light.

The calculation device 7 includes the moving mirror position calculation unit 72, the light intensity calculation unit 74, and the Fourier transform unit 76. The moving mirror position calculation unit 72 generates the moving mirror position signal X(t) based on the displacement signal. The light intensity calculation unit 74 generates, based on the first light receiving signal F(t) and the moving mirror position signal X(t), the interferogram F(x) (a waveform representing the intensity of the first light receiving signal F(t) at each position of the moving mirror 33). The Fourier transform unit 76 performs Fourier transform on the interferogram F(x) to generate a spectral pattern including information derived from the sample 9.

According to such a configuration, it is possible to adjust the driving of the second light source 41 such that a center wavelength (center frequency) of the length measurement light L2 is constant, by utilizing the fact that accuracy and stability of the energy between the levels of the atoms or molecules sealed in the gas cell 61 are extremely high. Accordingly, it is possible to implement the spectroscopic device 100 in which the wavelength of the length measurement light L2 is stabilized. In such a spectroscopic device 100, since the position of the moving mirror 33 can be measured with higher accuracy, it is possible to generate a spectral pattern with high accuracy on the wavenumber axis (wavelength axis).

In addition, in order to obtain the above-described effect, even when a small and inexpensive element such as a semiconductor laser element is adopted as the second light source 41, the wavelength stability of the length measurement light L2 can be enhanced. Accordingly, it is possible to reduce a size, a weight, power consumption, and cost of the spectroscopic device 100.

The light source control unit 65 preferably controls the wavelength of the length measurement light L2 (laser light) by adjusting, based on the emitted light amount detection signal SL1, a current (bias current) to be input to the second light source 41.

According to such a configuration, it is possible to implement the spectroscopic device 100 which has a relatively high response in stabilizing the center wavelength and contributes to high stability of the center wavelength of the length measurement light L2.

The second light source 41 may include the light emitting element 410 and the temperature adjustment element 412 that controls a temperature of the light emitting element 410. In this case, the light source control unit 65 has a function of controlling the wavelength of the length measurement light L2 (laser light) by adjusting output of the temperature adjustment element 412 based on the emitted light amount detection signal SL1.

According to such a configuration, it is possible to reduce the amount of change in the amount of light when adjusting the wavelength of the length measurement light L2. Accordingly, it is possible to prevent a change in the amount of interference light incident on the second light receiving element 45 of the length measurement unit 40. As a result, it is possible to prevent variation over time of the S/N ratio of the second light receiving signal S2.

The second light source 41 may include the package PKG accommodating the light emitting element 410. In this case, the temperature adjustment element 412 is provided inside the package PKG. According to such a configuration, the size of the spectroscopic device 100 can be further reduced.

The spectroscopic device 100 may further include the light output detection units 67 and 414. The light output detection units 67 and 414 detect the light output of the second light source 41 and outputs the light output detection signal SL2. In this case, the light source control unit 65 controls the light output of the length measurement light L2 (laser light) by adjusting, based on the light output detection signal SL2, a current (bias current) to be input to the second light source 41.

According to such a configuration, two types of feedback control (feedback control on temperature and on bias current) can be performed. Accordingly, the center wavelength (center frequency) of the length measurement light L2 emitted from the second light source 41 can be stabilized, and the light output (light amount) can be controlled to be constant.

The length measurement unit 40 may include an optical modulator 444. The optical modulator 444 includes the resonator 446 and adds the second modulation signal to the length measurement light L2 (laser light). Further, the spectroscopic device 100 may further include the oscillation circuit 81 that outputs the reference signal Ss with the resonator 446 as a signal source.

According to such a configuration, when the second light receiving signal S2 and the reference signal Ss are subjected to calculation in the calculation device 7, the influence of disturbances contained in both signals can be canceled out or reduced in the process of calculation. As a result, the calculation device 7 can determine the position of the moving mirror 33 with higher accuracy even when subjected to the disturbance. In addition, it is possible to reduce the size, the weight, and the power consumption of the spectroscopic device 100.

The light source control unit 65 may operate using the reference signal Ss. According to such a configuration, the configuration of the light source control unit 65 can be simplified, and the size of the spectroscopic device 100 can be further reduced and the cost can be reduced.

The second light source 41 is preferably a semiconductor laser element. Accordingly, a size of the second light source 41 can be particularly reduced. Therefore, it is possible to reduce a size and a weight of the spectroscopic device 100.

The spectroscopic device 100 may further include the first light source 51. Accordingly, alignment accuracy of the first light source 51 can be particularly enhanced, and loss of the analysis light caused by alignment failure can be reduced to the minimum.

The shape measurement device 200 according to the embodiments includes the analysis optical system 3, the length measurement optical system 4, and the calculation device 7.

The analysis optical system 3 includes the moving mirror 33 and the first light receiving element 36. The moving mirror 33 reflects analysis light emitted from the first light source 51 to add a first modulation signal. The first light receiving element 36 receives the analysis light including a sample-derived signal generated by an action of the analysis light emitted from the first light source 51 and the sample 9 and the first modulation signal, and outputs the first light receiving signal F(t).

The length measurement optical system 4 includes the second light source 41, the gas cell 61, the emitted light amount detection unit 62, the light source control unit 65, and the length measurement unit 40. The second light source 41 emits length measurement light which is laser light. In the gas cell 61, a gas that absorbs light of a predetermined wavelength is sealed, and the length measurement light is incident on the gas cell 61. The emitted light amount detection unit 62 detects an amount of the light emitted from the gas cell 61, and outputs the emitted light amount detection signal SL1. The light source control unit 65 controls the wavelength of the length measurement light based on the emitted light amount detection signal SL1. The length measurement unit 40 obtains a displacement signal corresponding to a position of the moving mirror 33 using the length measurement light.

The calculation device 7 includes the moving mirror position calculation unit 72, the light intensity calculation unit 74, and the shape calculation unit 78. The moving mirror position calculation unit 72 generates the moving mirror position signal X(t) based on the displacement signal. The light intensity calculation unit 74 generates, based on the first light receiving signal F(t) and the moving mirror position signal X(t), a waveform representing the intensity of the first light receiving signal F(t) at each position of the moving mirror 33. The shape calculation unit 78 calculates the shape of the sample 9 based on the waveform.

According to such a configuration, it is possible to adjust the driving of the second light source 41 such that a center wavelength (center frequency) of the length measurement light L2 is constant, by utilizing the fact that accuracy and stability of the energy between the levels of the atoms or molecules sealed in the gas cell 61 are extremely high.

Accordingly, it is possible to implement the shape measurement device 200 in which the wavelength of the length measurement light L2 is stabilized. In such a shape measurement device 200, since the position of the moving mirror 33 can be measured with higher accuracy, the shape of the sample 9 can be measured with high accuracy.

In addition, in order to obtain the above-described effect, even when a small and inexpensive element such as a semiconductor laser element is adopted as the second light source 41, the wavelength stability of the length measurement light L2 can be enhanced. Accordingly, it is possible to reduce a size, a weight, power consumption, and cost of the shape measurement device 200.

As described above, although the spectroscopic device and the shape measurement device according to the present disclosure are described based on the illustrated embodiments, the spectroscopic device and the shape measurement device according to the present disclosure are not limited to the embodiments. The configuration of each unit may be replaced with any configuration, or any other configuration may be added. The "embodiments" in the present specification also include modifications thereof.

The spectroscopic device and the shape measurement device according to the present disclosure may be a combination of two or more of the embodiments. Further, each functional unit provided in the spectroscopic device and the shape measurement device according to the present disclosure may be divided into a plurality of elements, or a plurality of functional units may be integrated into one.

Although a Michelson interference optical system is used in the above embodiments, other types of interference optical systems may be used.

Further, the arrangement of the sample is not limited to the shown arrangement. Since the sample-derived signal is generated by applying the analysis light to the sample, the sample may be disposed at any position as long as the analysis light emitted from the sample is incident on the first light receiving element. The arrangement of the gas cell is not limited to the shown arrangement.

What is claimed is:

1. A spectroscopic device comprising:
an analysis optical system;
a length measurement optical system; and
a calculation device, wherein
the analysis optical system includes:
    a moving mirror configured to add a first modulation signal by reflecting analysis light emitted from a first light source, and
    a first light receiving element configured to receive the analysis light including the first modulation signal and a sample-derived signal generated by a sample, and to output a first light receiving signal,
the length measurement optical system includes:
    a second light source configured to emit laser light,
    a gas cell with a gas that absorbs light of a predetermined wavelength sealed therein and configured to cause the laser light to be incident thereon,
    an emitted light amount detection unit configured to detect an amount of light emitted from the gas cell and to output an emitted light amount detection signal,
    a light source control unit configured to control a wavelength of the laser light based on the emitted light amount detection signal, and
    a length measurement unit configured to obtain a displacement signal corresponding to a position of the moving mirror by the laser light, and

the calculation device includes:

a moving mirror position calculation unit configured to generate a moving mirror position signal based on the displacement signal, a light intensity calculation unit configured to generate, based on the first light receiving signal and the moving mirror position signal, a waveform representing an intensity of the first light receiving signal at the position of the moving mirror, and a Fourier transform unit configured to perform a Fourier transform on the waveform to generate a spectral pattern including information derived from the sample.

2. The spectroscopic device according to claim 1, wherein the light source control unit controls the wavelength of the laser light by adjusting, based on the emitted light amount detection signal, a current to be input to the second light source.

3. The spectroscopic device according to claim 1, wherein the second light source includes a light emitting element and a temperature adjustment element configured to adjust a temperature of the light emitting element, and the light source control unit controls the wavelength of the laser light by adjusting an output of the temperature adjustment element based on the emitted light amount detection signal.

4. The spectroscopic device according to claim 3, wherein the second light source includes a package accommodating the light emitting element and the temperature adjustment element.

5. The spectroscopic device according to claim 3, further comprising:

a light output detection unit configured to detect a light output of the second light source and to output a light output detection signal, wherein the light source control unit further controls a light output of the second light source by adjusting, based on the light output detection signal, a current to be input to the second light source.

6. The spectroscopic device according to claim 1, wherein the length measurement unit includes an optical modulator including a resonator and configured to add a second modulation signal to the laser light, and the spectroscopic device further comprises an oscillation circuit configured to output a reference signal with the resonator as a signal source.

7. The spectroscopic device according to claim 6, wherein the light source control unit operates using the reference signal.

8. The spectroscopic device according to claim 1, wherein the second light source includes a semiconductor laser element.

9. The spectroscopic device according to claim 1, further comprising:

the first light source.

10. A shape measurement device comprising:

an analysis optical system;

a length measurement optical system; and a calculation device, wherein the analysis optical system includes:

a moving mirror configured to add a first modulation signal by reflecting analysis light emitted from a first light source, and a first light receiving element configured to receive the analysis light including the first modulation signal and a sample-derived signal generated by a sample, and to output a first light receiving signal, the length measurement optical system includes:

a second light source configured to emit laser light, a gas cell with a gas that absorbs light of a predetermined wavelength sealed therein and configured to cause the laser light to be incident thereon, an emitted light amount detection unit configured to detect an amount of light emitted from the gas cell and output an emitted light amount detection signal, a light source control unit configured to control a wavelength of the laser light based on the emitted light amount detection signal, and a length measurement unit configured to obtain a displacement signal corresponding to a position of the moving mirror by the laser light, and the calculation device includes:

a moving mirror position calculation unit configured to generate a moving mirror position signal based on the displacement signal, a light intensity calculation unit configured to generate, based on the first light receiving signal and the moving mirror position signal, a waveform representing an intensity of the first light receiving signal at the position of the moving mirror, and a shape calculation unit configured to calculate a shape of the sample based on the waveform.

* * * * *